United States Patent [19]

Mangat et al.

[11] Patent Number: 6,049,799
[45] Date of Patent: Apr. 11, 2000

[54] DOCUMENT LINK MANAGEMENT USING DIRECTORY SERVICES

[75] Inventors: Satwinder S. Mangat, Orem; Wayne Taylor, Provo; Steven Mahlum, Orem, all of Utah

[73] Assignee: Novell, Inc., Provo, Utah

[21] Appl. No.: 08/854,391

[22] Filed: May 12, 1997

[51] Int. Cl.[7] .................................................. G06F 17/30
[52] U.S. Cl. .................................. 707/10; 707/1; 707/2; 707/201; 709/203; 709/221; 710/11; 714/15; 370/396
[58] Field of Search .................................. 707/1, 2, 8, 9, 707/10, 200, 202, 203, 204, 100, 201, 3, 4, 513, 501; 710/11; 395/187.01, 200.53, 200.03; 709/203, 221; 714/15; 370/396

[56] References Cited

U.S. PATENT DOCUMENTS

| | | | |
|---|---|---|---|
| 4,899,299 | 2/1990 | Macphail | 707/204 |
| 5,497,463 | 3/1996 | Stein et al. | 395/200.03 |
| 5,504,891 | 4/1996 | Motoyama et al. | 707/513 |
| 5,548,726 | 8/1996 | Pettus | 709/221 |
| 5,594,921 | 1/1997 | Pettus | 710/11 |
| 5,717,922 | 2/1998 | Hohensee et al. | 707/100 |
| 5,761,683 | 6/1998 | Logan et al. | 707/513 |
| 5,778,385 | 7/1998 | Pratt | 707/200 |
| 5,787,442 | 7/1998 | Hacherl et al. | 707/201 |
| 5,794,232 | 8/1998 | Mahlum et al. | 707/3 |
| 5,825,772 | 10/1998 | Dobbins et al. | 370/396 |
| 5,828,833 | 10/1998 | Belville et al. | 395/187.01 |
| 5,832,225 | 11/1998 | Hacherl et al. | 395/200.53 |
| 5,835,698 | 11/1998 | Harris et al. | 714/15 |
| 5,850,518 | 12/1998 | Northrup | 709/203 |
| 5,887,171 | 3/1999 | Tada et al. | 707/4 |
| 5,893,122 | 4/1999 | Tabuchi | 707/501 |
| 5,987,471 | 11/1999 | Bodine et al. | 707/103 |

*Primary Examiner*—Thomas G. Black
*Assistant Examiner*—Charles L. Rones
*Attorney, Agent, or Firm*—Madson & Metcalf

[57] ABSTRACT

The present invention provides a method and apparatus for managing links between documents and other data structures, such as applications. Search mechanisms may include a directory services search engine for locating objects. A directory object data structure search engine may evaluate, search, or the like, various objects to obtain important information contained in attributes or data members thereof. An association list handler may be a search engine for searching association lists stored as attributes of objects for identifying desired documents. A standard query data structure may be applied by a query resolver to a document location table identified by a document location object. A query generator may be responsible to formulate the standard query data structure, or for formulating queries for all three types of search engines. A directory services database may be searched for an object. An object may be searched for a particular data member or attribute. A table may be pointed to by a directory services object. The table may be searched for an identification or distinguished name associated with a specific document desired. Likewise, fuzzy logic may be applied to obtain documents that are similar to desired documents that are similar to desired documents, rather than identical.

33 Claims, 13 Drawing Sheets

DISTINGUISHED NAME | DOCLOC OBJECT 130 214

| ATTRIBUTE INDEX 218 | ATTRIBUTE NAME 220 | SOURCE ID 222 | ATTRIBUTE FLAGS 224 | SYNTAX 226 | UPPER 228 | LOWER 230 | ASSIGN ID 232 | MANDATORY OPTIONAL FLAG 234 |
|---|---|---|---|---|---|---|---|---|
| 1 | TITLE | YII3-60 | DS-STR-ATTR 0X00000020 | CE-STRING | | | | OPT |
| 2 | LANGUAGE | Y113-25 | DS-PUBLIC-READ 0X00000080 | INTEGER | | | | OPT |
| 3 | VERSION | YII3-62 | DS-PUBLIC-READ 0X00000050 | CI-STRING | | | | OPT |
| 4 | DESCRIPTION | YII3-16 | | CE-STRING | | | | OPT |
| 5 | DOC FILE NAME | N | DS-READ ONLY-ATTR 0X00000008 | PATH | | | | MAND |
| 6 | DOCLOCTABLE PATH | N | DS-ATTR-SELF 0X00000008L | INTEGER | | | | MAND |
| 7 | DOC PUBLICATION STYLE | N | 0X00000008L | INTEGER | 1 | 20 | 0 | OPT |
| 8 | DOC FILE TYPES | N | 0X00000008L | INTEGER | 1 | 20 | 0 | OPT |
| 9 | DOC SECURITY | N | DS-READ ONLY 0X00000008 | PATH | 1 | 20 | 0 | OPT |
| 10 | FALL BACK DOCLOC OBJECT D.N. | | | | | | | |
| 11 | OBJECT CLASS | | | | | | | |
| ... | ... | ... | ... | ... | ... | ... | ... | ... |

METHODS
- 216a
- 216b
- 216c

*Fig. 6* ic # DOCUMENT LINK MANAGEMENT USING DIRECTORY SERVICES

BACKGROUND

1. The Field of the Invention

This invention relates to computer applications using or requiring access to documents and files and, more particularly, to novel systems and methods for retrieving documents and files even after a link has been lost between the document or file and an accessing application.

2. The Background Art

Applications executing on a computer typically require access to one or more documents, files, databases, and the like. A link to a document (location, identification) may be lost or broken occasionally. A break of a link between a document and an application accessing that document may occur due to one or more circumstances. Typically, a location change for one document referenced by another, a break in a hardware connection, an inadvertent closure or crash of an application, a removal of a file server from service, altering, deleting, or moving a document and a host of other occurrences may break a link between a document and an accessing application.

Locating a document that has inadvertently been lost or unlinked from an application is often difficult, sometimes impossible. Typically, much information that could be used to reestablish a link inadvertently broken may be destroyed in subsequent action by other applications or a user. Thus, maintaining links to documents is problematic.

Documents are not always static entities. A user may access, through an application, a document or file (generically referred to as a document, regardless of a format) only occasionally, compared to another user. Moreover, copies of a document may be made and distributed to various locations. Documents may be deleted by one user, unaware of another user's reliance thereon. Thus, a document, required or referenced by an application, or by another document used by an application, may be lost, removed, moved, destroyed, altered, and the like. Communication of such changes in the whereabouts or status of a document may create very frustrating consequences for an occasional user. Even relatively frequent users of particular documents may find great difficulties due to alterations to those documents' status.

Directory services systems have been implemented in many networks. A directory services system may include a database of objects that are scattered across the network on different servers, nodes, or other computers. However, all objects in the database are linked in a hierarchy establishing relationships therebetween. Directory services databases may be created to define and manage information related to an organization. Likewise, directory services databases may include information on software, hardware systems, assets, financial data, personnel, property, inventory, and the like. Directory services databases are well understood in the art. Directory services systems, also called network directory services, typically provide executables (e.g. engines) for inputting, linking, outputting, searching, updating, and the like, all of the objects within a directory services database. Certain standard functions including database management of contained objects, object structures including attributes and executables or methods related to those attributes, as well as user interfaces for providing inputs and obtaining outputs from directory services systems are well established.

What is needed is a method and apparatus for defining, tracking, updating, searching, and the like, certain key attributes useful for maintaining the links to documents. Certain features of a directory services system need to be incorporated into a link management method and apparatus to create, find, and reestablish links as required for storage and retrieval of the linked document.

BRIEF SUMMARY AND OBJECTS OF THE INVENTION

In view of the foregoing, it is a primary object of the present invention to provide a method and apparatus for maintaining, updating, finding, and re-making links (reestablishing known locations between documents and applications accessing those documents.

It is an object of the invention to provide a new type of directory services object that may be used to provide document management of documents accessed by users, groups of users, organizations, and the like.

It is an object of the invention to provide a document location object (Docloc object) providing a level of indirection between document location information and a directory services system.

It is an object of the invention to provide a data structure (e.g. Docloc table) that may be created and maintained outside a directory services system, but pointed to by the system (e.g. by a Docloc object) to store information about individual documents.

It is an object of the invention to provide a linking mechanism maintainable and searchable consistent with the infrastructure available in a directory services system.

It is an object of the invention to provide a method and apparatus for updating links between documents (e.g. linking information) without burdening a network directory services system with the maintenance of document linking information.

It is an object of the invention to provide an apparatus and method effective to search for a document whose link with an application has been broken, by searching progressively outward. Searching moves from a comparatively close proximity to the broken link in a defined manner most likely to find the desired document while minimizing processing time.

It is an object of the invention to provide an apparatus and method to broadly search over an entire network directory services system until a particular, desired document or a sufficiently similar document is located and provided to an application.

It is an object of the invention to provide a standardized query data structure for rapidly storing the available information about a broken link between one document and another or between an application and accessed data.

It is an object of the invention to provide an apparatus and method providing both deterministic and fuzzy logic for locating a document meeting some defined, significant, similarity criteria related to a desired document.

It is the object of the invention to provide a selection process or selector executable for selecting a similar document meeting similarity criteria when compared with a desired document that has not been located.

It is another object of the invention to provide an automatic, fuzzy-logic-based, selector module for automatically determining documents meeting certain, defined, selection criteria for similarity to a desired document.

It is another object of the invention to provide a selector module relying on a user interface to permit user interaction in selecting a similar document from a list of similar documents provided in accordance with certain selected similarity criteria to minimize the number of failures in finding documents after a break of a link between a document and an application.

Consistent with the foregoing objects, and in accordance with the invention as embodied and broadly described herein, a method and apparatus are disclosed in one embodiment of the present invention as including a method and apparatus for managing links between documents and other data structures, such as applications.

In one presently preferred embodiment, several types of search mechanisms exist. Search mechanisms may include a directory services search engine for locating objects in a directory services database. A directory object data structure search engine may evaluate, search, or the like, various directory services objects to obtain important information contained in attributes or data members thereof. Also, a query generator may provide a query data structure to be resolved against any data structure, such as a document, file, record, entry in a record, or the like.

Directory services objects may contain an attribute called an association list. An association list may include identifiers pointing to data structures or other objects associated therewith. In one embodiment, an association list handler may be one form of a search engine for searching directory services objects. The association list handler may find and query association lists for identification related desired documents. The association list handler may also be implemented in various broader embodiments to search for association lists among other attributes.

A standard query data structure may be applied by a query resolver to a Docloc table identified by a Docloc object. A query generator may be responsible to formulate the standard query data structure, or for formulating queries for all three search engines.

Thus, a directory services database may be searched for an object. An object may be searched for a particular data member or attribute. A Docloc table may be pointed to by a data member of a directory services object. The Docloc table may be searched for an identifier unique to a specific document desired. Likewise, fuzzy logic may be applied to obtain "similar" documents, deemed useful in place of an unlocatable, desired document, but not identical thereto.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 6 is a schematic block diagram of a Docloc object consistent with the invention and suitable for inclusion in a network directory services system adapted to implement the methods and apparatus of the invention;

DETAILED DESCRIPTION OF THE PREFERRED EMBODIMENTS

It will be readily understood that the components of the present invention, as generally described and illustrated in FIGS. 1–14 herein, could be arranged and designed in a wide variety of different configurations. Thus, the following more detailed description of the embodiments of the system and method of the present invention, as represented in FIGS. 1 through 14, is not intended to limit the scope of the invention, as claimed, but is merely representative of the presently preferred embodiments of the invention.

The presently preferred embodiments of the invention will be best understood by reference to the drawings, wherein like parts are designated by like numerals throughout.

Figure 1:
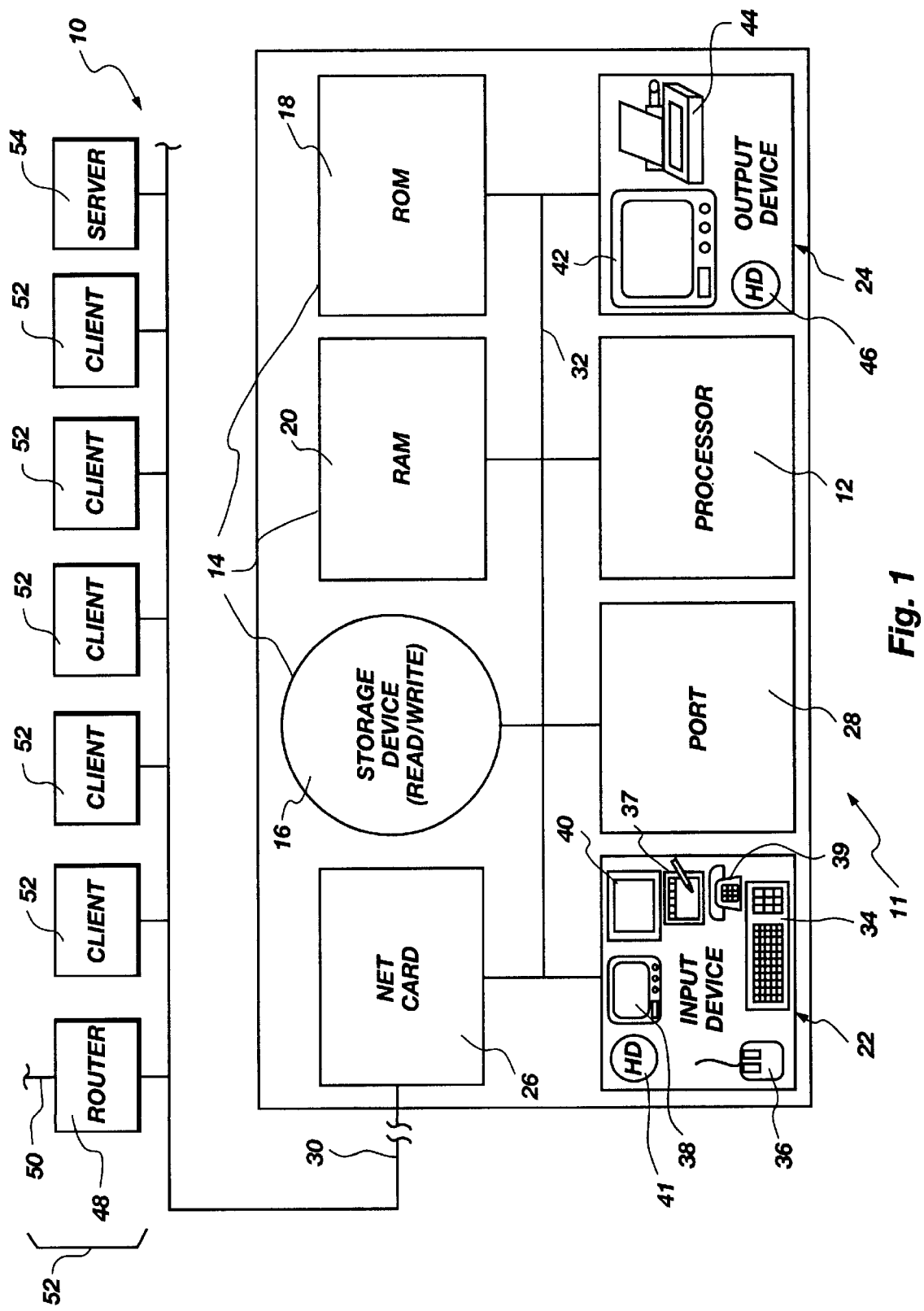
FIG. 1 is a schematic block diagram of an embodiment of an apparatus for implementing a document link management system in accordance with the invention.
Figure 7:
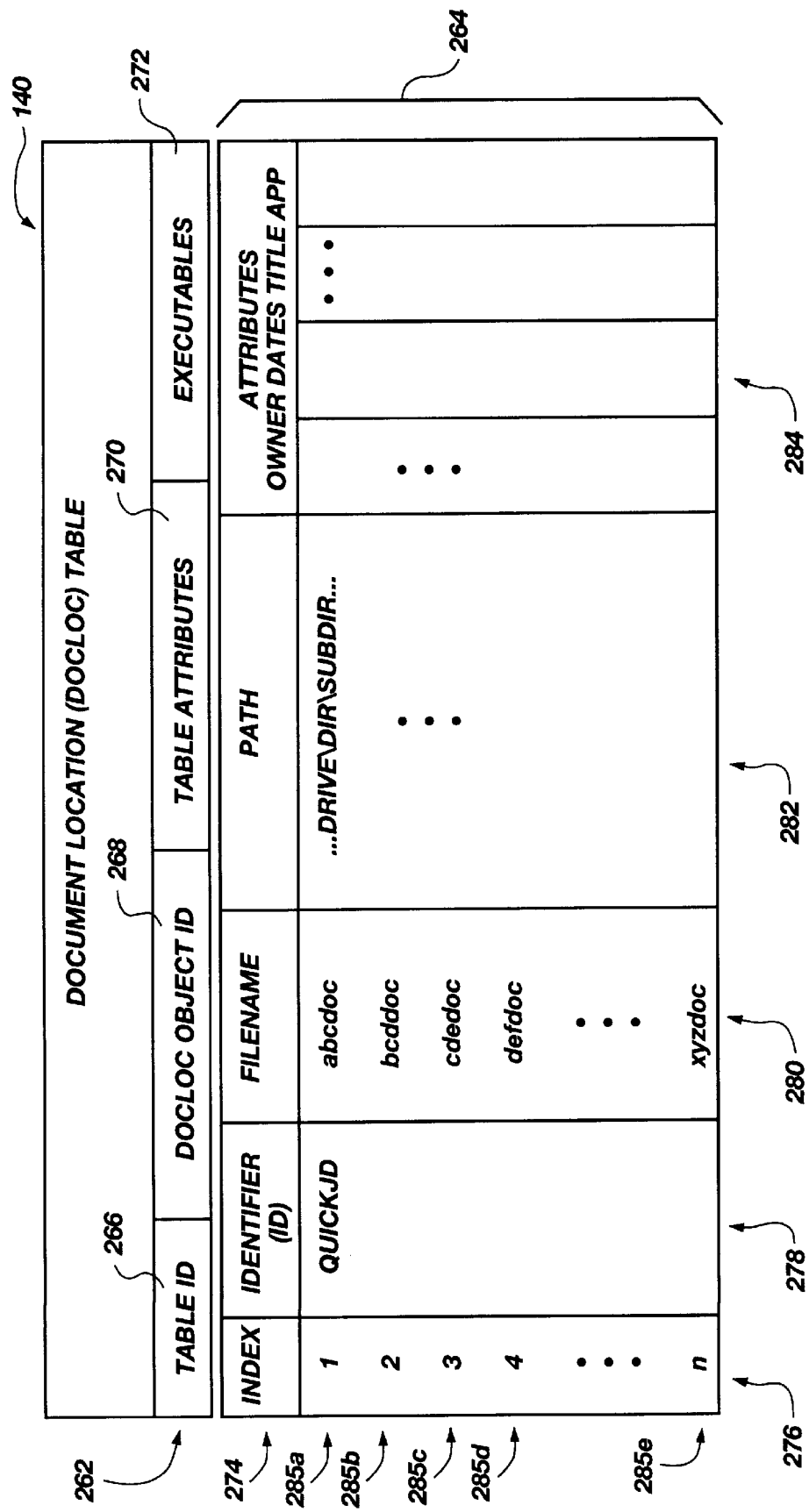
FIG. 7 is a schematic block diagram of one embodiment of a document location table or Docloc table that may store document information accessible through indirection provided by the Docloc object of FIG. 6.

FIG. 1 illustrates an apparatus for implementing a method in accordance with the invention on one or more computers in a network. FIGS. 2–6 illustrate data structures that may be stored in memory or storage devices on various computers within a network, and includes objects for implementing methods in accordance with the invention. FIG. 7 illustrates a table for locating documents to reestablish links therewith. FIGS. 8–11 illustrate unique document link management methods in accordance with the invention.

Figure 12:
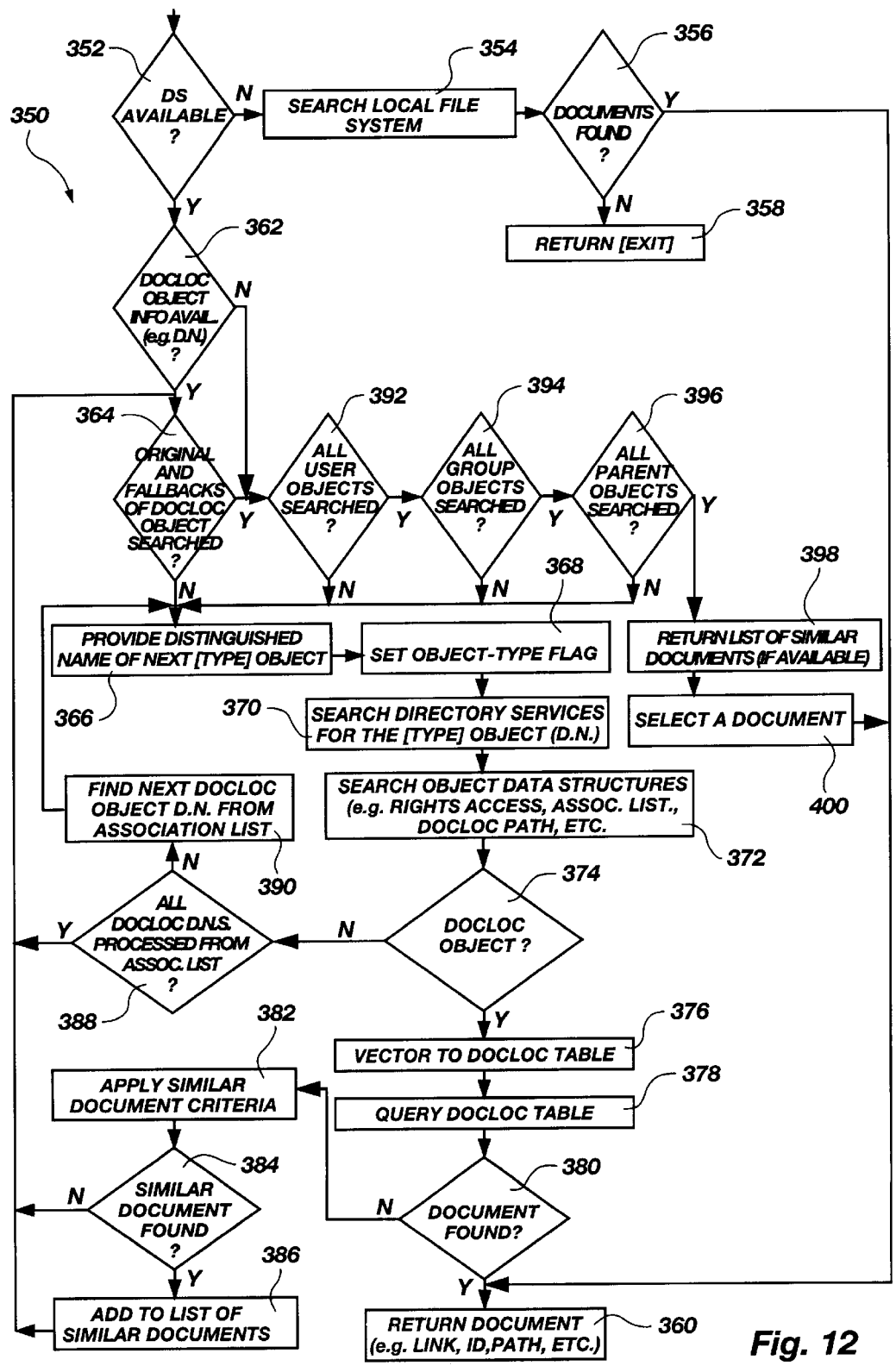
FIG. 12 is a schematic block diagram of one embodiment of a method in accordance with the invention for implementing a link management method and apparatus.
Figure 13:
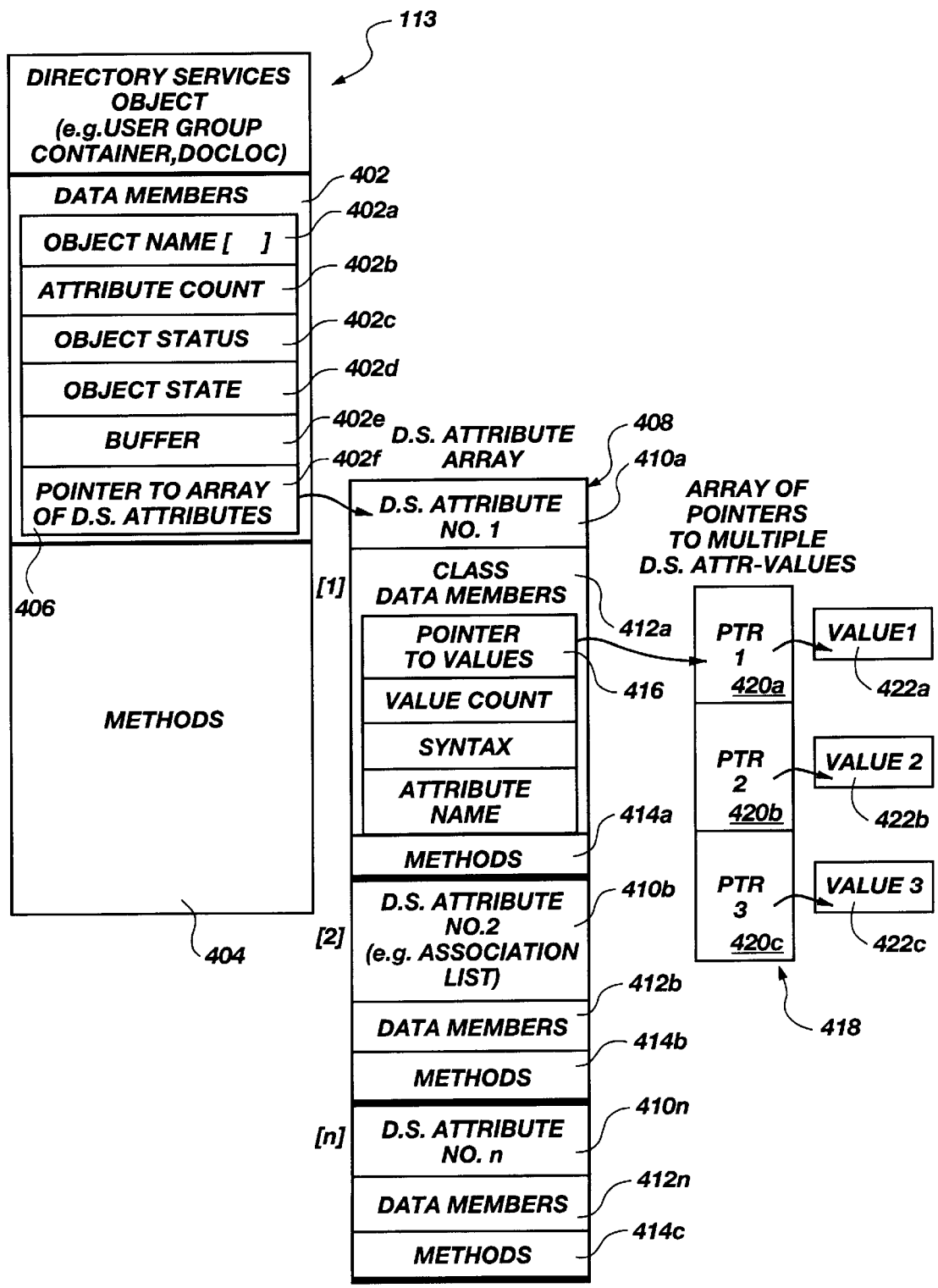
FIG. 13 is a schematic block diagram of a generic data structure for a directory services object.
Figure 14:
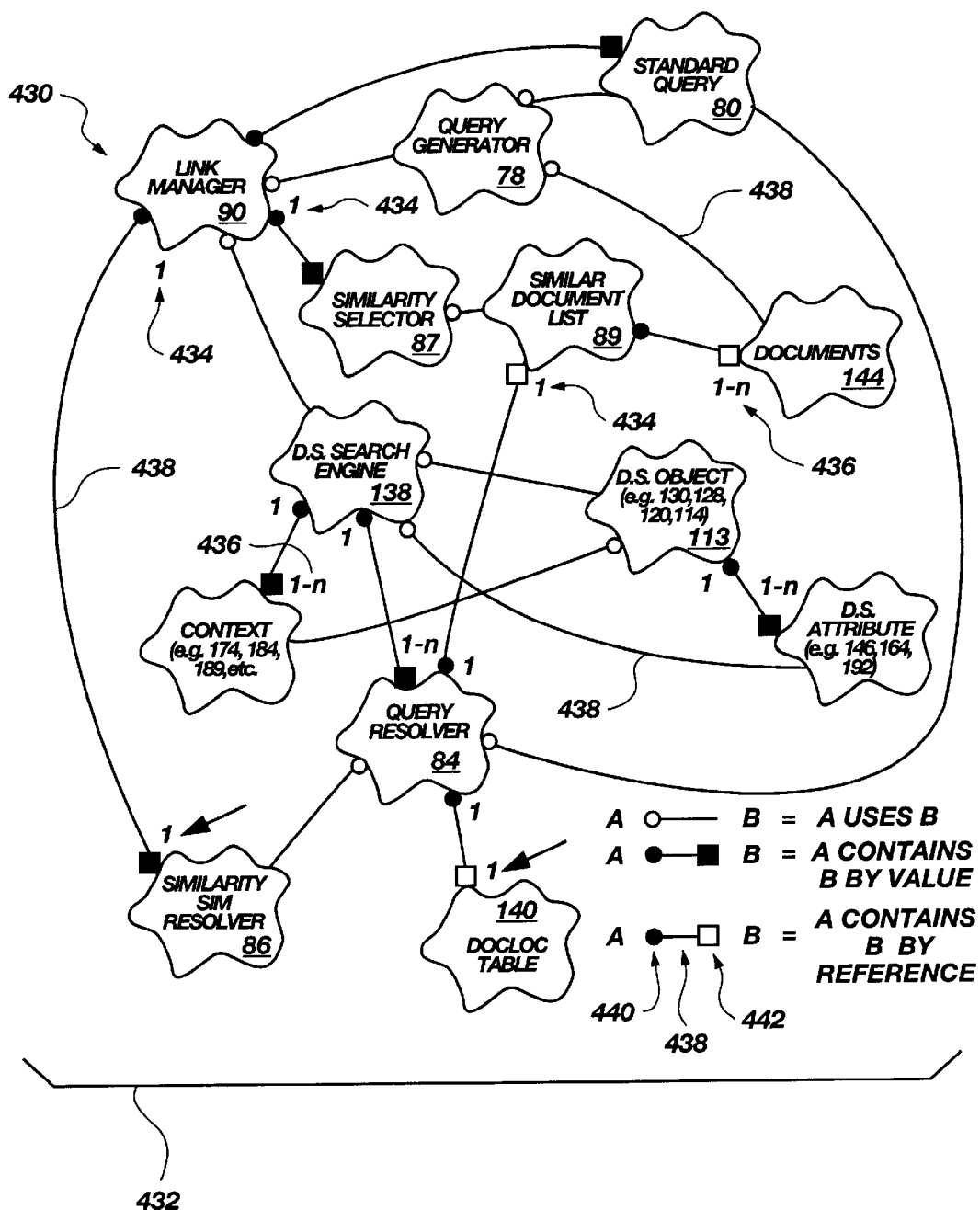
FIG. 14 is a schematic block diagram of a link management system, illustrated in accordance with object-oriented programming conventions and relationships.

FIG. 12 illustrates a method for traversing a network directory services database in search of an object that will identify a document desired. FIGS. 13 illustrates a class of directory services object having an array of attribute classes, each attribute supporting multiple values. FIG. 14 is a class diagram of a link management system in accordance with the invention, using Booch notation for object-oriented programming.

Referring now to FIG. 1, an apparatus 10 may implement the invention on one or more nodes 11, (client 11, computer 11) containing a processor 12 or CPU 12. All components may exist in a single node 11 or may exist in multiple nodes 11, 52 remote from one another. The CPU 12 may be operably connected to a memory device 14. A memory device 14 may include one or more devices such as a hard drive or non-volatile storage device 16, a read-only memory 18 (ROM) and a random access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like. Similarly, a scanner 40 may be used to receive graphical inputs which may or may not be translated to other character formats. The hard drive 41 or other memory device 41 may be used as an input device whether resident within the node 11 or some other node 52 (e.g., 52a, 52b, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 52, 54) may have various communication capabilities.

In certain embodiments, a minimum of logical capability may be available in any node 52. Note that any of the individual nodes 11, 52, 54 may be referred to, as may all together, as a node 11 or a node 52. Each may contain a processor 12 with more or less of the other components 14–44.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
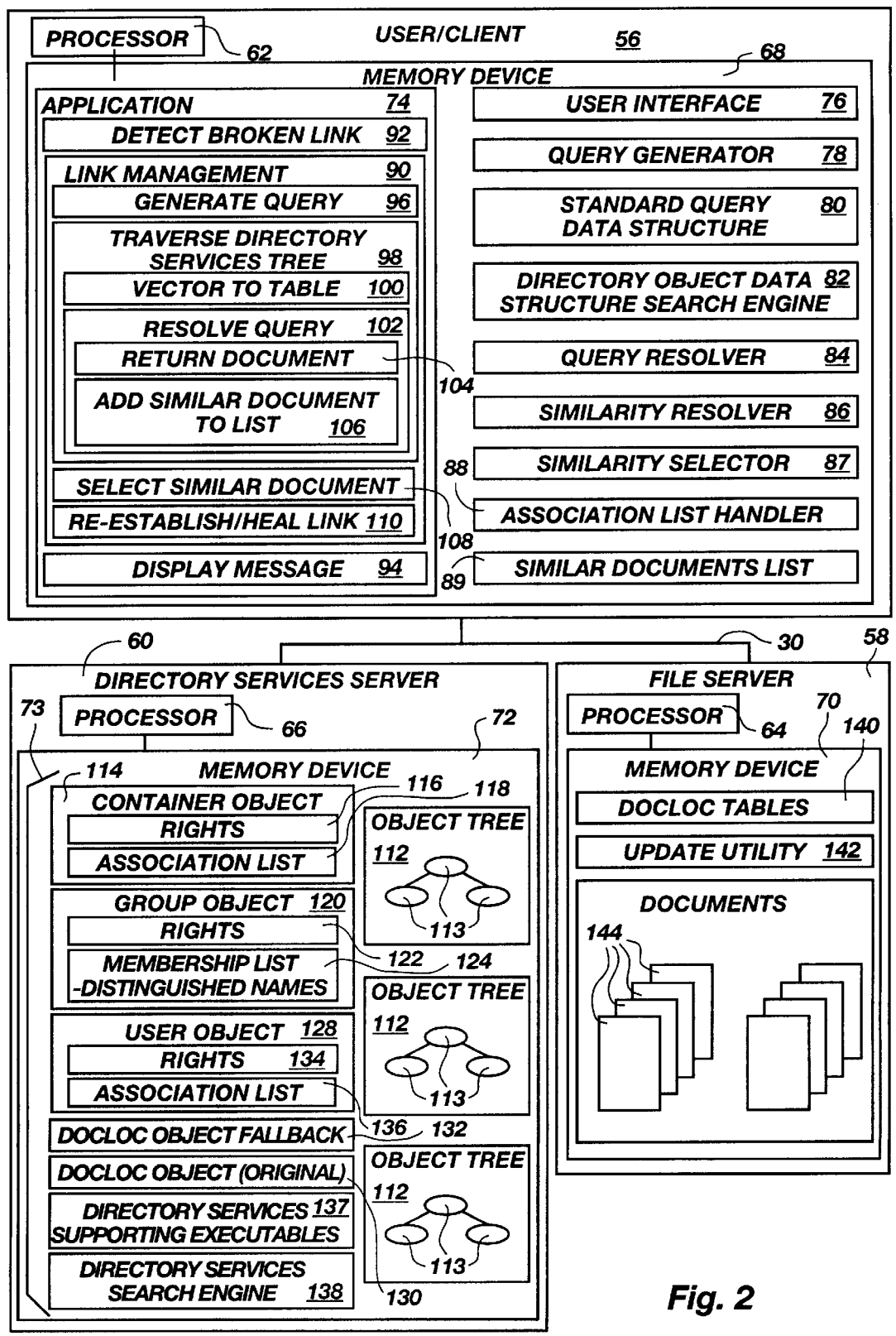
FIG. 2 is a schematic block diagram of the data structures contained in the storage and memory devices of a user or client computer, a server (e.g. for applications, files), and a directory services server in the apparatus of FIG. 1.

Referring to FIG. 2, in view of FIG. 1, a user station 56 or client station 56 may correspond to or be implemented in a node 11. Similarly, a file server 58 and a directory services server 60 may be implemented in other nodes 52, such as a server node 54. The user station 56 may include a processor 62, the file server 58 a processor 64, and the directory services server 60 a processor 66.

Note that a file server 58, as that term is used herein, may, in general, serve any type of file, whether containing data or executables (e.g. applications, communications, databases, etc.). The term "file server" as used herein is for convenience only. A discussion of a generalized host for certain data structures (e.g. Docloc tables, update utility, documents) is needed. The term file server 58 may refer to any server, or simply any computer or multiple computers hosting one or more of the data structures.

One may note that a server 54 in general, may be implemented on more than one node 52. Similarly, multiple servers 54 may be implemented in a single node 52, loaded with appropriate software and having a properly partitioned storage device 16. Thus, in one embodiment, the user station 56, directory services server 60, and file server 58, may all be installed in a single computer 11, 52, 54.

The user station 56, file server 58, and directory services server 60 may include corresponding memory devices 68, 70, 72, respectively. The memory devices 68, 70, 72 operate, respectively, with the corresponding processors 62, 64, 66.

A memory device 68 in a user station 56 may host one or more applications 74. Available to the application 74, incorporated therein, or independently available, may be a user interface 76 executable by the processor 62 as is the application 74. In general, an executable stored in a memory device 68, 70, 72 may typically be stored in a format readily executable on the respective processor 62, 64, 66. Whether a particular executable is physically located within an application 74, or is merely called by a statement in the application 74, is irrelevant to the logical execution of the application 74 or some other executable, such as the user interface 76, and so forth.

The user interface 76 may provide graphical icons and images, buttons, interactive boxes, and the like, for providing outputs to a user, and for accepting inputs from a user. Various user interfaces 76 abound. One important feature of the user interface 76 in the memory device 68 is an ability to provide to a user appropriate outputs required for effective interaction, and an ability to accept corresponding inputs.

The application 74 may call, include, or otherwise access other executables, depending on the exact programming format of the application 74. A query generator 78 may be used to generate a query effective to identify a desired document. A query generator 78, in general, formulates a standard query data structure 80 that may be used to efficiently search for a document.

Note that a document may be any type of file, whether executable or not. A "document" may be virtually any addressable entity. A document may exist at any level, such as a file, directory, volume, server, or the like.

In one currently preferred embodiment of an apparatus and method in accordance with the invention, the standard query data structure 80 may be used to parse or evaluate location information available about a desired document. Similarly, the query generator 78 may be programmed to use information available at the time that a link failure is discovered. This may occur at a time remote from the actual break in a link to a document 144.

Information may be parsed out of the data necessary for inclusion in a standard query data structure 80. Alternatively, a query may be created manually by a user directly. For example, a dialogue box available to a user may accept inputs, operands, and operators selected or provided by a user. The user may provide information related to a broken link, such as a title, name, path, owner, dates, or identifying data.

A directory services object data structure search engine 82 may be provided in addition to a search engine 138 available with a network directory services system. For example, in general, a server 60, represented in a directory services tree 112 (database 112), may actually store one or more directory services databases 112 (trees 112). The directory services databases 112 may be configured as object trees 112 containing objects 113.

The directory services server 60 may store, in the memory device 72, a directory services search engine 138 for execution by the processor 66. The directory services search engine 138 may be used to search any of the databases 112 for a particular object.

A directory services object data structure search engine 82, or simply the search engine 82, may also be implemented. In one currently preferred embodiment, a search engine 82 is programmed for searching a particular object 113 in a database 112, once that object 113 has been located by the directory services search engine 138.

A query resolver 84 may be programmed to test a standard query data structure 80, or the contents thereof, against a particular object 113 in a directory services database 112. In one embodiment of an apparatus and method in accordance with the invention, the query resolver 84 may operate on an object 113 within a directory services database 112, but upon another data structure or object. Such a data structure is a document location table 140 (see FIG. 7) to which an object 113 in a network directory services database 112 points. In general, a query resolver 84 may operate within or upon an object 113 in a directory services database 112. The query resolver 84 may operate on some external data 140 to resolve a query defined by the standard query data structure 80.

In one embodiment, fuzzy logic may be relied upon in a similarity resolver 86. That is, it is always possible that a desired document 144 is not available. Nevertheless, previous versions of the desired document 144, similar documents 144, or other documents 144 bearing significant relationships to a desired document 144 may be available. Accordingly, a similarity resolver 86 may apply certain fuzzy logic criteria to various documents 144 contained in a memory device 70 in order to locate a similar document.

Likewise, a similarity resolver 86 may operate on objects 113 in a directory services database 112. The similarity resolver 86 may identify "similar" documents 144 meeting certain criteria and deemed useful in place of a desired document 144. Criteria may include comparisons with selected portions of certain attributes of a document 144. Although a similarity resolver 86 may make a determination automatically concerning certain documents meeting certain fuzzy logic criteria for similarity, a user may be included in a decision loop.

A similarity selector 87 may include executables for presenting to a user, through a user interface 76, for example, certain documents 144 that have been partially resolved or have been included by the similarity resolver 86. Accordingly, a similarity selector 87 may provide a user with an ability to select one document 144 from among several documents 144 that have been deemed to be sufficiently similar to a desired but unavailable document as to be useful in place thereof. A similarity selector 87 may be entirely automated. Alternatively the selector 87 may be implemented with a very rudimentary selection process controlled directly by a user.

In one embodiment of an apparatus and method in accordance with the invention, an association list handler 88 may be created to search through association lists associated with various objects 113 in directory services databases 112. Association lists may be objects, tables, data structures, and the like, for identifying various other objects, data, and the like, having an association with an object 113 in a directory services database 112. An association list handler 88 may be programmed to execute on the processor 62 in order to traverse, search, loop, and the like, through data in an association list, seeking data required to identify a desired document 144.

In one currently preferred embodiment of an apparatus and method in accordance with the invention, an application 74 may be provided with a link management module 90. The link management module 90 may be physically contained within the actual lines of code in an application 74. Alternatively, a link management module 90, just as the executables 76–88, may be implemented in a library, routine, or the like to be called at an appropriate time by the application 74. Nevertheless, logically, a link management module 90 may be implemented in an application 74 between a detect executable 92 or a detect broken link 92 and a display module 94 or display message module 94, display executable 94, or the like. In general, an application 74, upon a failure to find a desired document 144, may execute a line, command, routine, or the like corresponding to a detect 92. The detect 92 determines that a link has been broken or cannot be formed with a desired document 144 by the application 74.

Applications 74 typically execute a display module 94 effective to display some kind of a message to a user. In accordance with the invention, a user of an application 74 desires to have the broken or missing link provided as transparently as possible. Accordingly, the link management module 90 may execute certain steps to do so.

In general, a link management module 90 may contain a generate query executable 96. The generate query 96 may be a call to the query generator 78. Alternatively the generate query executable 96 may be a generator 78 to actually create a query. The result of the generate query executable 96, whether a single line, a call, a routine, or embedded code within an application 74, is to identify pertinent information about a desired document 144. Identified information is related to the broken or missing link identified by the detect broken link executable 92.

In general, a traverse executable 98, or traverse directory services tree executable 98, may operate in conjunction with the search engine 138 belonging to a directory services server 60. By whatever means, the traverse executable 98 is programmed to be effective to traverse, as needed, all objects 113, in a directory services database 112, in search of information that will provide a desired document 144. The traverse executable 98 may rely on unique data structures created specifically for managing documents 144 and identifying or storing certain key information about those documents 144.

A traverse executable 98 may include a vector executable 100. The vector executable 100 or vector to Docloc executable 100 is effective to vector to document location information, based upon information available at the time of execution of the detect executable 92. The vector executable 100 may vector to a certain intermediate object 113 within a directory services database 112.

In one preferred embodiment, the vector executable 100 may vector out of the directory services database 112 to a document 144 at a specified location. For example, in one presently preferred embodiment, documents 144 may be stored in a file server 58 to minimize unnecessary and somewhat unproductive burdens on the directory services server 60. To treat individual documents 144 as objects 113, and have all of those documents 144 as objects 113 in a directory services database 112 is possible.

However, the nature of documents 144 is such that the overhead of managing changes to documents 144 and changes to the status of documents 144 may unnecessarily burden a directory services server 60. Accordingly, in one presently preferred embodiment, certain objects 113 in a directory services database 112 may simply point to documents 144 that are "resident" on a file server 58. Thus, the documents 144 may receive changes to their content or status (e.g. location, etc.) without affecting the more stable (less frequently altered) object structures 113 of the directory services database 112.

In one currently preferred embodiment, the vector executable 100 may vector directly to a document 144 or a document location table 140 or Docloc table 140 in order to test or identify a potential document 144. The resolve query 102 may thereupon test to determine whether or not an apparently related document 144 is indeed a desired document 144 that the link management module 90 is seeking.

Resolution 102 of a query may typically take on two approaches. A deterministic approach may result in a return document executable 104. That is, if certain deterministic information available at the time of execution of the detect broken link executable 92 is resolved 102 against a particular document 144, then a return document executable 104 may identify the match and return the desired document 144.

Alternatively, many documents 144 may exist that have certain similarities to a desired document 144, without being identical thereto. Accordingly, an add executable 106 or add similar document to list 106 may evaluate a particular document 144. For example, an evaluation may determine that a particular document 144 is sufficiently similar to a desired document 144 to be of interest.

The fuzzy logic used by the add executable 106 may take on several forms. Comparison of certain contents of a standard query data structure 80, such as titles, names, paths, dates, and the like, may be compared with the corresponding data in a Docloc table 140 corresponding to a particular document 144 being evaluated. If an entry 285 in a Docloc table 140 is not exact, comparisons may be made in addition. For example, if a name 280 is not identical to a desired name, then a similar name having a different extension may be suitable. Likewise, if a name 280 is not identical, some portion (substring) of the name string may be compared with the standard query data structure 80 as appropriate. Similarly, a substring of any of the fields 274 of an entry 285 in a Docloc table 140 may be compared with the standard query data structure 80. Substring percentages may be set by a user.

For example, a user may insist that the first five characters, main characters, or the like contain a perfect match. Alternatively, a user may determine that 80 percent, 75 percent, 50 percent, or the like, of a string should match. A user may select some criterion, such as 50 percent, below which a value of a field 274 is of no interest.

Alternatively, the add executable 106 may perform an initial comparison between several entries 285. A selection may be a best entry from a single Docloc table 140, or each single Docloc table 140 considered. Thus, unless, and until, an exact is match is found, each Docloc table 140 accessed may provide at least one proposed, similar document 144. Selection may be subject to certain minimum similarity criteria (e.g. 50 percent, four characters, etc.) being met by a field 274 value. Alternatively, an exact match may be required.

In the event that an exact match is not found by the return document executable 104, the add executable 106 may create and maintain a list of similar documents 144. The add executable 106 may include many varieties of fuzzy logic for determining a proximity of a document 144 to a desired document 144.

For example, the add executable 106 may include a test beginning at a closest proximity to a user or an application 74. Accordingly, criteria may include a test to identify a user identified in an access list, or search lists of a user's membership in a particular group or organization. Tests may evaluate contents, titles, or paths similar to those of a desired document. Such information may help determine that a high probability exists for a document 144 to be included for consideration by a user, if an exact match is not found.

Accordingly, the add executable 106 may operate continuously during a resolve query executable 102 in order to provide an alternate document 144 or a list of alternate documents 144. However, if the return document executable 104 does at some point find an exact match, the output of the add executable 106 may be obviated.

A select executable 108 or select similar document 108 may be as simple as a call to the similarity selector 87, or may be self-contained. For example, as discussed for the similarity selector 87, a user may select directly a document 144 provided by the add executable 106. Alternatively, a select executable 108 may operate automatically according to fuzzy logic criteria identifying information, portions of information, and the like, identifying a document 144.

A similarity selector 87 may operate similarly to an add executable 106. As discussed above, various types of comparisons or similarity may be used. In one embodiment, a user may select a document manually from a menu. Alternatively, a user may select a document from a list 89 based on certain criteria set in a filter, sort, or other comparison logic engine. In yet another alternative, a user may request that only documents 144 meeting certain, user-specified criteria, such as document type, format, distinguished name, title, path, dates, key words, or combinations thereof, be considered.

A user interface 76 may be programmed to provide windows, menus, dialogue boxes, input prompts, feedback displays, and the like, for interacting with a user while specifying operation of the similarity selector 87. Such features of a user interface 76 may be engaged for manual selection or for setting up automatic selection among documents 144.

A reestablish executable 110, or reestablish link executable 110, may provide a path and name of a document 144. These or any other identifying characteristics may establish a link between a desired document 144 and an application 74 desiring or needing access thereto. The reestablish executable 110 may be sophisticated or simple in accordance with the needs of an application 74.

If an exact match is found, the application 74 may update the linking information (e.g. in the application or referring document) to refer to the newly matched link (location) information. In one embodiment, the link management module 90 may provide feedback to an application 74 (generally, the referencing document) enabling a healing executable 110 to correct the reference in the referencing (calling) application 74 or referencing document.

Similarly, a user interface 76 may be implemented to permit user intervention in the reestablish executable 110. For example, a user may intervene to verify that a document 144 provided by the resolve query 102 is proper. Alternatively, an exact match of a document 144 by the return document executable 104 may result in an automatic execution of the reestablish executable 110. Similarly, after a user has intervened in a select executable 108, the reestablish link executable 110 may be automatically executed to make linking transparent to a user. For example, a new address of the returned document 144 may be automatically provided (e.g. to the calling application 74, intermediate referencing document 144, etc.). A healing executable may be provided to correct the reference that gave rise to discovery of the broken link.

A failure of the resolve query 102 to locate a desired document 144 may result in a failure of the link management module 90. Accordingly, the display message executable 94 may proceed as if the link management module 90 did not exist. That is, a failure of the link management module 90 to locate a desired document 144 or a similar document 144 to be linked to an application 74, at worst, simply leaves the application 74 with a display executable 94 and no link.

In summary, an application 74 may be provided with a detect module 92, a link management module 90, and a display module 94. The link management module 90 may include executables or modules such as a generate module 96, a traverse module 98, a vector module 100 and a resolve module 102. The resolve module 102 may include a deterministic module 104 and a fuzzy logic module 106 in order to identify desired documents 144. The select module 108 may be implemented with or without user intervention to select a similar document 144 as a result of the fuzzy logic module 106. Likewise, a reestablish module 110 may use the deterministic output of the deterministic module 104 or the selection output by the select module 108 to reestablish a link between a document 144 and an application 74. User intervention may be available, required, or absent, as desired.

In general, a directory services server 60 may include a memory device 72 for storing a variety of executables, executable by the processor 66. A memory device 72 may host a directory services system 73 containing data and executables to be processed by a processor 66. In addition, a memory device 72 may include directory services databases 112. In general, a directory services database 112 may be referred to as an object tree 112.

A directory services database 112 may be sufficiently large to render impractical storage in a single memory device 72. A storage device 16, 18 (see FIG. 1) may be included in a server 60 to contain an entire database 112. A particular subtree 112 (a subset of a larger object tree 112) may actually be stored at any given time in a memory device 72 (an instance of RAM 20).

Various object trees 112 may be stored. For example, organizational entities may be objects 113 in a single object tree 112. Similarly, individual users may be represented as objects 113 in an object tree 112. In general, an object tree 112 may be thought of as any tree or subtree desired.

It is unnecessary here to recite all of the available technology implemented in network directory services servers 60. It is sufficient to know that a hierarchy 112 or tree 112 of objects 113 may be stored in a memory device 72 for access by a processor 66. Significantly, each object 113 may include both data and executables, in accordance with object-oriented programming technology.

Objects 113 may be of various types. For example, an object 113 may be a container object 114 or a leaf object 120, 128, 130. A container object 114 may contain other objects 113. In fact, a container object 114 may include other container objects 114. In general, in addition to containing other objects 113, a container object 114 may have attributes such as rights 116 associated therewith. Similarly, an association list 118 may be an attribute of a container object 114. The association list 118 may include various types of information identifying data and objects 113 having an association with a container object 114 as defined in the association list 118.

A leaf object, such as a user object 128, Docloc object 130, or group object 120 does not contain other objects. A group object 120 identifies members of a group. Thus, a group object 120 may include certain rights 122 and similar attributes. However, a significant feature of a group object 120 is a membership list 124. Typically, a membership list 124 may contain a list of distinguished names 126. Distinguished names are unique names identifying member objects 113 that pertain to a group 120 defined by the group object 120.

A user object 128 may be associated with a particular user having rights 134 to access documents 144 on a file server 58. A user object 128 may be linked in an object tree 112 as any other object 113. A user object 128 may have certain attributes related to rights 134, as well as an association list 136. The association list 136 may include information about data and objects 113 having some association with a user identified by the user object 128. For example, in one currently preferred embodiment, association lists 118, 136 may include identifying information relating to associated documents 144. In one embodiment, a Docloc object 130 may be created. A Docloc object 130 may be named in an association list 136 of a user object 128. Similarly, a Docloc object 130 may be identified in an association list 118. In general, a Docloc object 130, in accordance with the invention, may be created to store information identifying documents 144.

A Docloc object 130 may simply be a document 144. However, in one presently preferred embodiment, a Docloc object 130 may actually point to a particular Docloc table 140 which Docloc table 140 identifies several documents 144, which may have some shared relationship to one another.

For security, redundancy, speed of operation, and the like, other instances 132 of a Docloc object 130 may exist. The Docloc object fallback 132 or instance 132 may exist within the memory device 72. Also, various other instances may exist in other locations within other memory devices 68, 70. Moreover, the Docloc object fallback 132 may be replicated in other object trees 112 in other directory services servers 60 on other networks 50 (See FIG. 1).

Certain directory services supporting executables 137 may provide additional input, output, management, manipulation, tracking, and other functions desirable in maintaining the object trees 112 or directory services databases 112. In certain embodiments, the supporting executables 137 may simply be incorporated into various methods of objects 113 within object trees 112. Likewise, the search engine 138 may be implemented as a method within one of the objects 113. Nevertheless, functional support of a directory services system 73 may be implemented in some combination of executables 137 and objects 113 containing both executable methods and data structures as attributes.

In general, a directory services server 60 may host a directory services search engine 138. The directory services search engine 138 or simply the search engine 138 may permit the processor 66 to locate any particular object 113 in any of one or more object trees 112. Thus, the search engine 138 may be a general purpose routine or executable for creating, presenting, and resolving a query relating to an object 113.

Typically, a distinguished name may be associated with an object 113. The distinguished name is a unique identifying tag, data structure, or the like that will be globally unique for a particular object 113. Accordingly, the search engine 138 may routinely identify an object 113 that is searched.

In one presently preferred embodiment, a memory device 70 of a file server 58 may contain certain tables 140. The tables 140 or Docloc tables 140 may contain information identifying documents having some relationship to one another. The Docloc tables 140 may be stored in the memory device 70 rather than within the directory services databases 112 or the memory device 72 to minimize the work load imposed on the processor 66 of the directory services server 60.

For example, an update utility 142 may be created to identify any retrieval, saving, alteration, moving, removal, or the like relating to a particular document 144. Accordingly, the update utility 142 may maintain the Docloc tables 140. An update utility 142 may be executed by the processor 64 to detect, identify, and appropriately respond to any action by the processor 64 with respect to a document 144. The local nature of the update utility 142 and the Docloc tables 140 supports a certain amount of indirection in management of the documents 144. For example, a Docloc object 130 may be one of the objects 113 in an object tree 112 stored in a memory device 72, or accessible thereby. In one sense, a Docloc object 130 provides a link to a Docloc table 140. Thus, a Docloc object 130 stored in an object tree 112 may be identified in an association list 118, 136 of yet another object 114, 128, respectively.

The Docloc object 130 need not change dramatically or frequently, compared with the actual documents 144. Thus, it is advantageous, in one embodiment of an apparatus and method in accordance with the invention, to permit frequent and local access by the update utility 142 to the Docloc tables 140 reflecting the status of documents 144.

In general, a Docloc table 140 may contain identifying information for any practical number of documents 144. However, in one presently preferred embodiment, a Docloc object 130 will relate to a single Docloc table 140. The Docloc table 140 may actually be the Docloc object 130.

However, certain advantages accrue to a Docloc object 130 that changes infrequently with respect to the documents 144. Thus, the indirection of a Docloc object 130 that points to a Docloc table 140 is very beneficial. The documents 144 need not be maintained as objects 113 in the directory services databases 112. An application 74 may thus rely on a Docloc object 130 to establish a link to a Docloc table 140 and thus a link to a referenced (desired) document 144.

Figure 3:
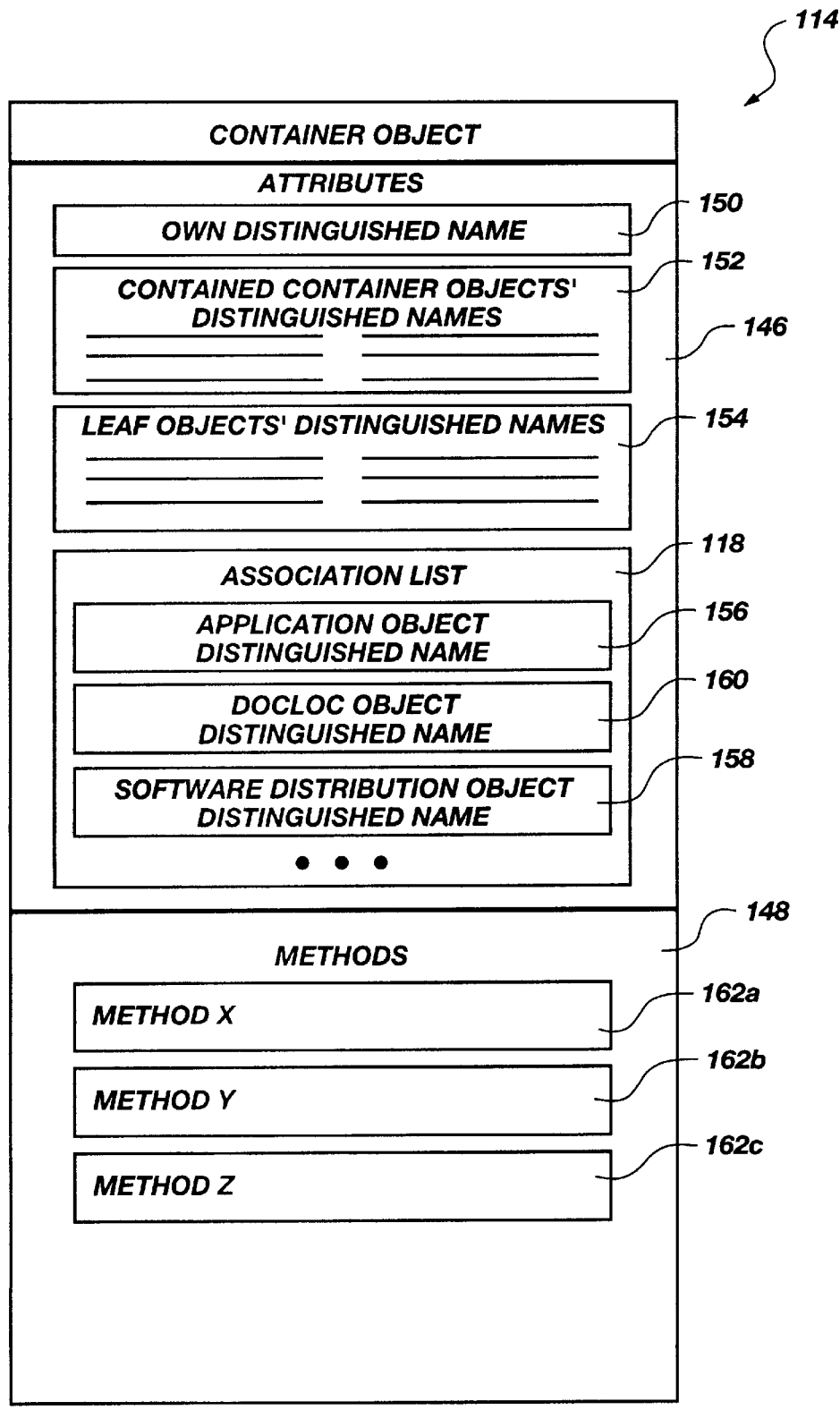
FIG. 3 is a schematic block diagram of a container object consistent with the invention and contained within a network directory services system.

Referring now to FIG. 3, specifically, and generally to FIGS. 2–6, an understanding of the various objects 113 may be gathered from the illustrated data structures. For example, in FIG. 3, a container object 114 may contain both attributes 146 and methods 148. One may think of attributes 146 as data to be operated upon or to be provided, while methods 148 may represent executables encapsulated within the particular object 114.

Attributes 146 of interest may include a distinguished name 150 corresponding to an individual container object 114. The distinguished name 150 or own distinguished name 150 may represent a title, numerical code, index number, or some other unique identifier that globally identifies a container object 114 within a network directory services database 112. The distinguished name 150 may actually identify the container object 114 globally within an entire directory services system 73 hosted on multiple servers 60.

Thus, a particular distinguished name 150 may globally distinguish a single container object 114 among all objects 113 in all object trees 112 in one or more memory devices 72 associated with a directory services server 60. One distinguished name 150 corresponds to one container object 114. However, in general, any object 113 may have a distinguished name 150.

Often in modem programming, little distinction is made between code actually contained physically within a data structure, and code that is merely referenced, and thereby available logically, within a data structure. Accordingly, distinguished names 152 may be stored to represent and bind contained container objects 114 that are subordinate to another container object 114 in an object tree 112. Since a container object 114 may contain other objects 113, some of those other contained objects 113 may be other container objects 114.

Similarly, leaf objects may be "contained" within a container object 114. Containment may be effected by storing distinguished names 152, 154 pointing to (linking) contained objects 152, 154. Note that a distinguished name 152, 154 may also be referred to herein as the object 152, 154, itself, represented thereby. The distinguished names 152, 154, need not be treated as different types of attributes 146.

The container object 114 may contain an association list 118. An association list 118 need not be single, but may be plural. Nevertheless, in one embodiment, a single association list 118 may represent any and all association lists 118 desired or required.

An association list 118 may include distinguished names 156, 158, 160 corresponding to disparate objects 113, such as an application object 74, a Docloc object 130, or a software distribution object 158, respectively. One may note that herein an object 113, in general, may be referred to as the object itself, or as the name (distinguished name 156, 158, 160). Each of the objects 156, 158, 160 may be included in the association list 118 because a relationship exists between the container object 114 associated with the association list 118, and the respective objects 156, 158, 160.

One may think of an application object 156 as an application 74, encapsulated within an object 113. Similarly, a Docloc object 160 (e.g. Docloc object 130 of distinguished name 160) may point to or otherwise identify documents 144 or a Docloc table 140 having some relationship to the container 114. The name 160 may be thought of as identifying a Docloc object 130 relating to the container object 114. Similarly, a software distribution object 158 may relate to the container object 114 by identifying parameters defining a distribution to or from or affecting to, from, or affecting the container object 114.

In general, an object 113, such as a container object 114 may include attributes 146 alone, methods 148 alone, or any combination of attributes 146 and methods 148. For example, certain methods 162a, 162b, 162c may effect certain executables useful in providing, manipulating, using, and the like, the attributes 146 of a container object 114. Similarly, the methods 162a, 162b, 162c, may simply provide certain functional features useable to or from the container object 114.

Figure 4:
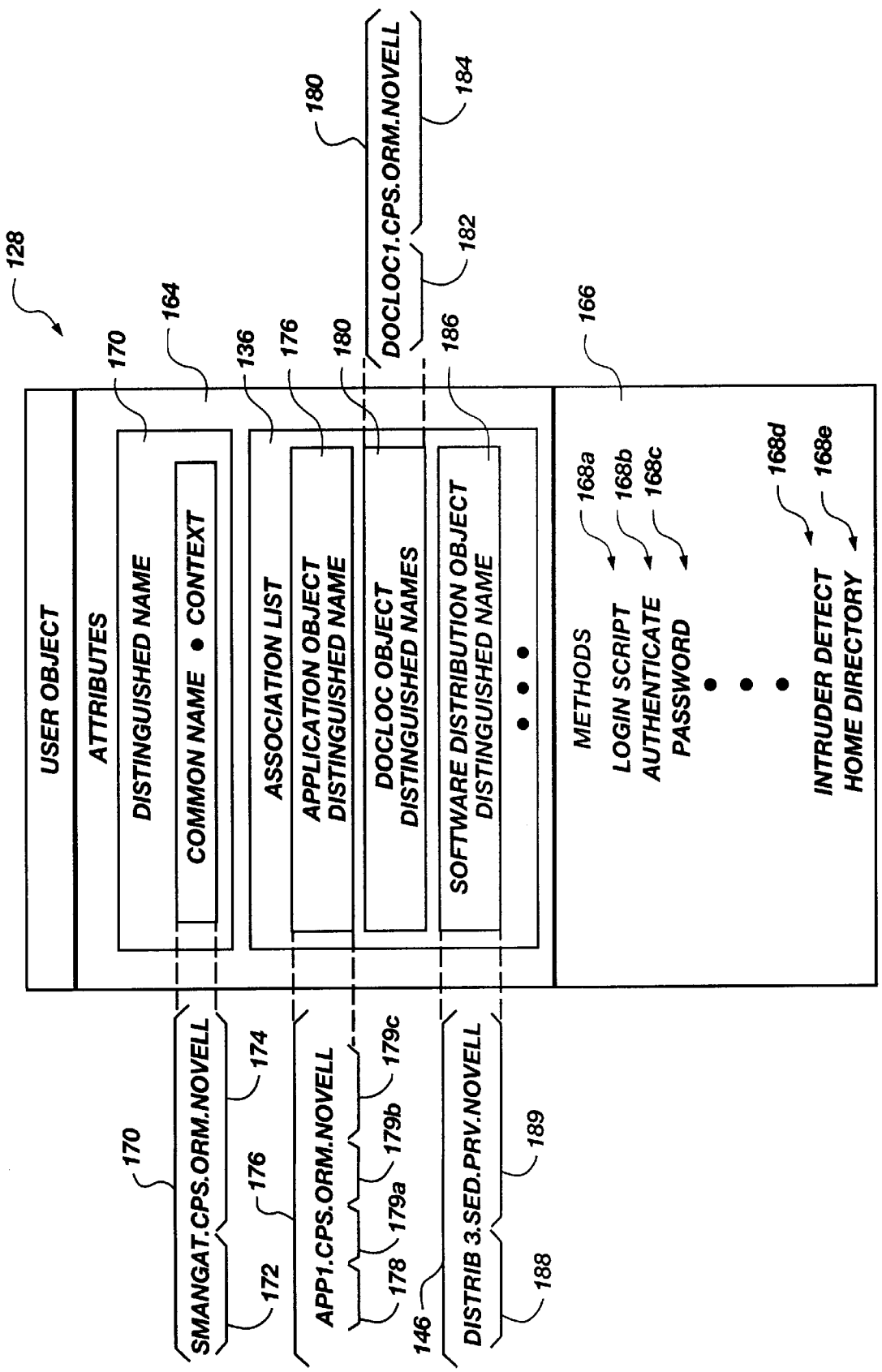
FIG. 4 is a schematic block diagram of a user object consistent with the invention and suitable for inclusion in a network directory services system.

Referring now to FIG. 4, and also generally to FIGS. 2–6, a user object 128 may be contained within a container object 114. In such a case, the container object 114 may be referred to as a parent object 114. A user object 128 contained therein is referred to as a child object 128.

A distinguished name 170 may be associated with a user object 128. The distinguished name 170 is analogous to the distinguished name 150 of a container object 114. A distinguished name 150, 170 provides a location of an object 113 in the tree 112. In the aggregate, each of the distinguished names 150, 170 provides a unique identifier for a corresponding object 113 within the tree 112.

A distinguished name 150, 170 may be configured in a specific, standardized data structure. For example, a distinguished name 170, 150 may include a common name 172 and a context 174. A common name 172 may identify a user associated with a user object 128 or may identify the user object 128.

The context 174 may identify something more concerning the location, function, association, or the like of the user object 128. For example, the association list 136 may include a distinguished name 176 corresponding to an application object (e.g. application 74 for example). The common name 178 is associated with a particular application (e.g. the application 74, in the example).

A context 179 may be constructed of several sub-contexts or elements 179a–179c. For example, certain instances of context elements 179 include one or more of instances a location element 179a, an organizational element 179b, and a global affiliation element 179c, such as a company affiliation 179c. The context 179 may correspond directly to the context 174. The contexts 174, 179 may be identical as illustrated in the example of FIG. 4.

A Docloc object distinguished name 180 may be included in an association list 136. The distinguished name 180 should typically include a common name 182, and context 184, identifying a specific Docloc object 130.

The context 184 may or may not be identical to the contexts 174, 177. Such a context 184 may logically arise since it may represent geographical, organizational, and other affiliation information that will be associated with a user object 128. By contrast, certain distinguished names 186 may include common names 188 with contexts 189 that are themselves unique.

For example, the software distribution object 186 may be generated by someone other than a user associated with a user object 128. Accordingly, a distribution object 186 may affect a user object 128 having some relationship thereto.

The association list 136 may bind or link the distribution object 186 to the user object 128. The software distribution object 186 may not necessarily "belong to" or originate from within the same contexts 174, 177 as the user object 128.

An association list 136 need only be limited by practical considerations. For example, access, maintenance, storage, execution times, and the like, may affect the management of an association list 136.

The user object 128 may include encapsulated methods 166 such as the methods 168a–168e illustrated. The methods 168a–168e may provide functional features desirable to be provided to or from the user objects 128 and relating to the attributes 164. For example, a log-in script 168a, an authenticate executable 168b, a password executable 168c, an intruder test executable 168d, a home directory executable 168e, or other methods 168 may be included. It is unnecessary to recite all of the technology available in directory services systems 73 for creating, operating, and managing objects 113 such as user objects 128 and container objects 114.

Figure 5:
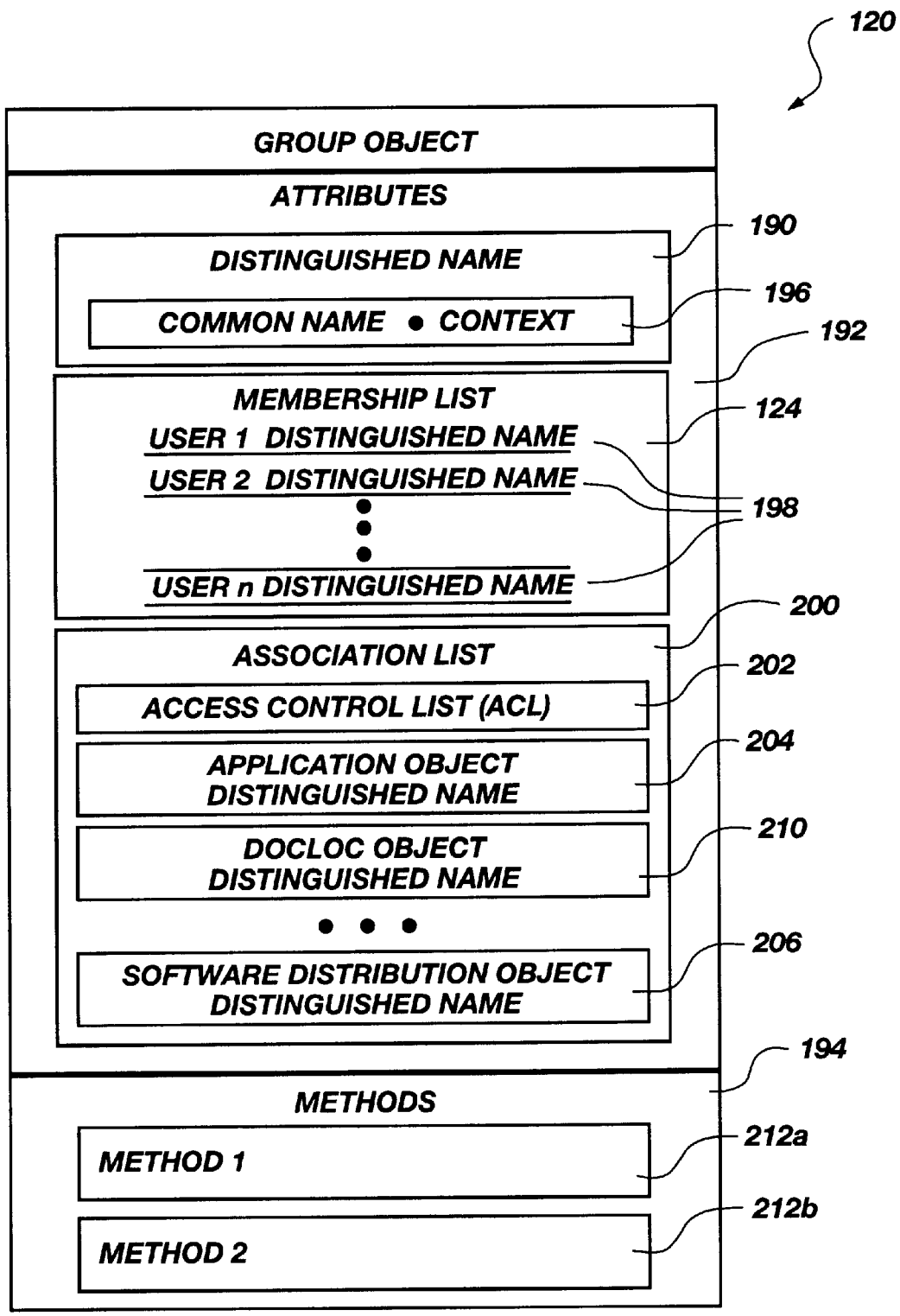
FIG. 5 is a schematic block diagram of a group object consistent with the invention and suitable for inclusion in a network directory services system.

Referring now to FIG. 5, specifically, and continuing to refer to FIGS. 2–6 generally, a group object 120 may have a distinguishing name 190 as an attribute 192. Similarly, methods 194 may be encapsulated in a group object. However, a distinguishing feature of a group object 120, as compared with a container object 114, is a lack of contained objects 113. A group object 120 has a membership list 124 as an attribute 192. Members of a single group 120 may be objects 113 from many different containers 114.

Alternatively, one may think of the individual distinguished names 198 contained in a membership list 124 as individual attributes as well. The distinguished names 198 may identify users, for example, or user objects 128 having some relationship to the group object 120. A group object 120 may be thought of as defining a group 120.

A membership list 124 may include both container object distinguished names 150 and leaf object user object distinguished names 170. The membership list 124 identifies (e.g. links, binds) the distinguished names 198 as belonging a group 120 represented by the group object 120.

As with other objects 113, (e.g. for example, objects 114, 128) an association list 200 may be an attribute 192 or contain attributes 192 associated with a group object 120. For example, an access control list 202 may identify objects 113 having access to the association list 200 or the group object 120. Similarly, the distinguished name 204 may identify an application associated with the group 120.

A Docloc object distinguished name 210 may identify a Docloc object 130 associated with a group 120. The software distribution object distinguish name 206 may identify a particular software distribution object 206 having some relationship to a group 120 represented by the group object 120. In certain preferred embodiments of an apparatus and method in accordance with the invention, association lists 200 may be limited to relatively brief, unique, distinguished names 204–210. The distinguished names 204–210 may then serve as pointers or as a basis of a query to be resolved by a workhorse search engine 138 of a directory services system 73.

As with other objects 113, a group object 120 may include methods 194, such as the methods 212a, 212b. The methods 212 may include any suitable executables for storing, managing, manipulating, retrieving, etc, attributes 192, inputs, and outputs.

The association list handler 88 may be thought of, in one presently preferred embodiment, as a search engine for identifying within an association list 136, 118, or a membership list 124 a desired object 113. The association list handler 88 may rely on certain capabilities of a directory services search engine 138 to find a particular object 113 identified in such an association list 118, 124, 136, 200, or the like.

Querying responsibilities may be allocated to the directory services search engine 138 to find a Docloc object 130, 132, a user object 128, a group object 120, or a container object 114. Meanwhile, responsibility may be placed upon the association list handler 88, in conjunction with, or independently of, the directory services search engine 138 to query association lists 118, 136, 200 to identify objects 113 identified therein by respective distinguished names 160, 180, 210, and the like. Meanwhile the query resolver 84 may be allocated the single responsibility of querying or resolving a query directed to a Docloc table 140, a Docloc object 130, or the like.

Thus, in one embodiment, a directory services search engine 138 may navigate the directory services databases 112. The association list handler 88 may navigate association lists 118, 124, 136, and the like. The query resolver 84 navigates the data structures of individual objects 113, such as a Docloc object 130, or navigates a Docloc table 140.

In one presently preferred embodiment, three searching approaches exist for searching. For objects 113, the search engine 138 operates. For the distinguished names 160, 180, 210 in the data structures of individual objects 113, the association list handler 88 operates. For a path 282 and file name 280 of a document 144 within a data structure of a Docloc table 140 or Docloc object 130 pointing thereto, a resolver 84 and standard query data structure 80 operate. Three queries thus provide a proper division of tasks for an effective architecture implementing one presently preferred embodiment of the invention.

Referring now to FIG. 6, specifically, and generally to FIGS. 2–6, a Docloc object 130 may have a distinguished name 213 as one of its attributes 214. The distinguished name 213 may be stored in the Docloc object 130. Alternatively, a Docloc object distinguished name 213 may simply be identified elsewhere by an address location or a pointer to the location in memory 72 containing the Docloc object 130.

In general, a Docloc object 130, as other objects 113, may include attributes 214 and methods 216. The methods may be functionally similar to the methods 194 discussed above, or other methods available. Attributes 214 and methods 216 need only be provided as required according to the purpose of a particular object 113, such as the Docloc object 130. In one embodiment, a Docloc object 130 may contain only attributes 214.

In one currently preferred embodiment, a Docloc object 130 may contain several fields 218–234. For example an attribute index 218 may provide a shorthand identifier for a particular attribute name 220. An attribute name 220 may correspond to an expression in a natural language to be easily identifiable with the name 220. A source ID 222 may indicate an identifier, path, or other pointer to identify either a source of the attribute name, by document, file, application, or the like, stored in a memory device 14, 72.

Certain flags 224 may be identified with particular attribute names 220. Similarly, a syntax 226 may be identified for reading either the attribute name 220, the attribute flags 224, or the contents identified thereby within the actual document 144 or the Docloc table 140.

Similarly, an upper bound 228 and a lower bound 230 may identify memory addresses containing the particular attribute 214 identified by an attribute name 220. An assignment ID 232 may be provided as may an additional flag 234 indicating either a mandatory or optional nature of a particular attribute 214.

Some of the attributes 214 that may be useful in an apparatus and method in accordance with the invention are identified as the attributes 238–260. For example, a title 238 may be descriptive of a Docloc object 130. A language attribute 240 may identify either a computer language or a natural language associated with a Docloc object 130.

Another attribute 214 may be a version 242. A version 242 may identify certain controlling numbers identifying the most recent updating of a Docloc object 130 or the Docloc table 140 associated therewith. In one presently preferred embodiment, the version 242 may relate to the Docloc object 130, and not to updates of the Docloc table 140, due to the relatively higher frequency of updates required for the Docloc table 140. A description 244 may provide information further explaining the nature of a Docloc object 130.

One valuable attribute 214 is a path 250 or Doclocation path 250 identifying the path associated with a Docloc table 140 corresponding to a Docloc object 130. The path 250 may actually include the file name associated with a Docloc table 140. Alternatively, the path 250 may include only the context, such as a network identification, a server or storage device identifier, a volume identifier, and a path leading up to the name 246 as the last element for the most detailed element of a path. Thus, the name 246 and the path 250 may operate together to completely define or identify a Docloc table 140 corresponding to the Docloc object 130.

A style 252 may be included as an attribute 214. The style 252 or Docpublication style 252 may identify a particular identifiable style adhered to by a particular Docloc table 140. Styles may include, for example, HTML, HELP, TEXT, application documents, etc. Similarly, a type 254 or multiple types 254 associated with a Docloc table 140, or with each of the documents 144 identified in a Docloc table 140 may be stored in a type attribute 254.

A security attribute 256, alternatively referred to as a Docsecurity attribute 256, may identify local, global, cryptographic, or other security information associated with a Docloc table 140 and enforced or communicated by a Docloc object 130. For example, attributes 256 may include draft, confidential, public, etc. limitations.

A fallback attribute 258 may identify the existence and locations of duplicates, replicas, fallbacks, and the like, corresponding to the Docloc object 130. The existence of a fallback Docloc object 132 may be beneficially contained in a Docloc object 130 to be provided upon breaking off a link to a document retrievable through use of a Docloc object 130.

Other attributes 214 may include an object class 260. The object class 260 identifies the type of object 113, which in this case is a Docloc object 130. Other information that may be of use to a user or to a link management module 90 may be included as an attribute 214.

Referring now to FIG. 7, a document location table 140 or simply a Docloc table 140 may contain information 262 directly related to the Docloc table 140, the Docloc object 130 corresponding to the Docloc table 140, the binding therebetween, or the like. A path 250 and name 246 (see FIG. 6) in a Docloc object may provide certain binding to the Docloc table 140.

The Docloc table 140 may include such indication within itself organically, such as a Docloc ID 266. The ID 266 may include a distinguished name, a full path, or the like. Similarly, a Docloc table 140 may include other binding data 268. For example, a name, or a group of names of Docloc objects 130 that are related or pointing to a Docloc table 140 may be included in binding data 268. In one presently preferred embodiment, no information 262 may be required within a Docloc table 140.

Thus, a Docloc table 140 may or may not be able to identify a Docloc object 130 to which it is bound.

Nevertheless, in alternative environments, both a Docloc object 130 and a Docloc table 140 may contain mutual binding data 250, 268, respectively.

The Docloc table 140 may be a file, in one presently preferred embodiment. Thus, the Docloc table 140 may be treated as a document 144.

Alternatively, a Docloc table 140 may be an object. For reasons discussed previously, a Docloc table 140 may still be resident outside of a network directory services database 112. Nevertheless, suitable methods may be encapsulated with the attributes 270 to add any desired functional features.

Whether or not a Docloc table 140 is not configured as an object, certain attributes 270 may be desirably maintained within the Docloc table 140. Certain codes or commands representing certain executables 272 may be incorporated within the Docloc table 140, whether or not the Docloc table 140 is encapsulated within an object.

The document information 264 relates directly to individual documents 144 identified in a Docloc table 140. For example, multiple fields 274 may identify documents 144 with sufficient specificity to uniquely identify them. For example, an index 276 may be local or global.

A file name 280 and a path 282 may be provided. A unique ID 278 may or may not include the name 280 and context 282. The ID 278 may still specifically and uniquely identify any particular document 144 represented in a Docloc table 140.

Any attributes 284 of interest to a user, or of some functional use to a link management module 90, may be included as attributes 284. For example, the attributes 214 of the Docloc object 130 of FIG. 6 may be suitable examples of attributes 284. Such attributes, in a Docloc table 140 corresponding to documents 144, may include, for example, an owner, dates, title, application, etc. Certain of the attributes 214 may also directly relate to all documents of the Docloc table 140 pointed to by a Docloc object 130.

By contrast, the attributes 284 may include many of the same attributes 214, of the Docloc object 130, pertaining to the individual documents 144 identified by the contents of the fields 274 in the Docloc table 140. Various attributes 284 may identify information concerning length, security parameters, access, links, link types, pointers, file types, application identifiers, and the like, corresponding to particular documents 144.

The file name 280 and path 282 may identify uniquely any document 144 referenced in a Docloc table 140. Accordingly, in one embodiment in accordance with the invention, a Docloc table 140 may include only a file name 280 in a path 282 for any individual entry 285. The reference numerals 285 followed by trailing alphabetical characters may be thought of as individual instances of the same generic item, the entries 285. Thus, the individual entries 285a–285e are merely particular instances of a generic entry 285.

Figure 8:
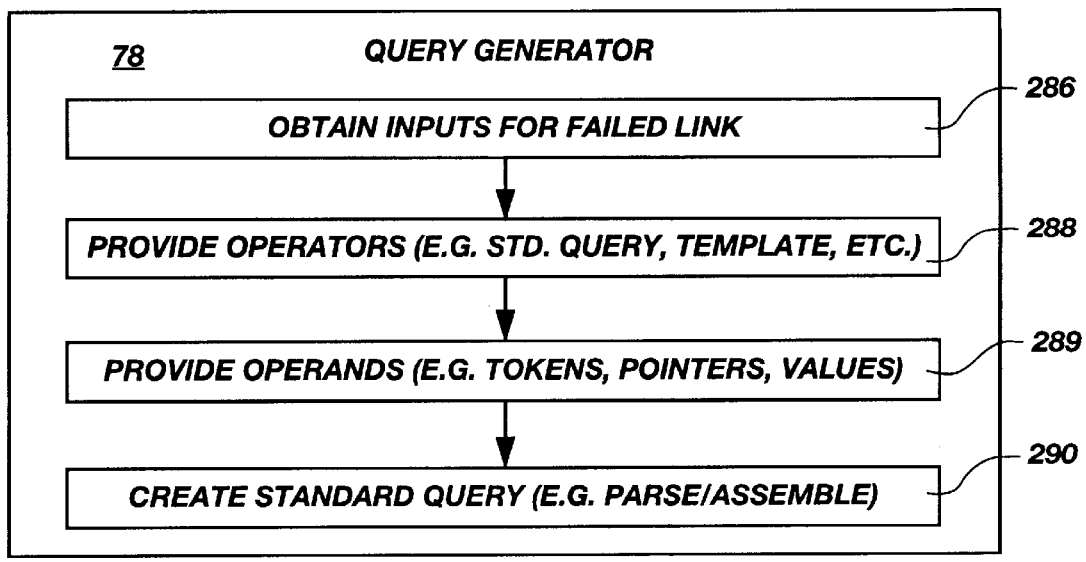
FIG. 8 is a schematic block diagram of one embodiment of a query generator module illustrating steps for creation of a query consistent with the invention.

Referring to FIG. 8, a query generator 78 may be implemented in a variety of configurations. However, in one embodiment, the query generator 78 may include an obtain inputs step 286 or executable 286 to obtain inputs relating to a document 144 and a user station 11 associated therewith for a failed link. The obtain inputs step 286 or executable 286 may be programmed to identify information effective or likely to uniquely identify a document 144 to which a link has been lost.

Of course, a link may be lost at some unknown time. For example, a document 144 may be altered. The status (e.g. location, path, address, name) of a document 144 may be altered many hours, days, or months before a particular application 74 seeks access thereto. Nevertheless, certain information, such as path information and document name, or the like associated with a document 144 may be available.

The provide operator step 288 may occur in response to the nature of the inputs available, or may be determined in advance. For example, operators may be provided that are arranged in a standard query format or a standard template or the like. Thus, the available operators for a query 80 or standard query data structure 80 may be limited. Alternatively, user interaction for deterministic logic, or the like may be used to provide operators 288.

Operands may be provided in a provide operands step 289 or executable 289. For example, tokens, pointers, values, and the like, to be operated on by operators 288 may be provided in the provide operands step 289. Note that each of the steps 286–290 may be thought of as a step in the process executed by a query generator 78, but may also be filed as the data provided thereby or used therein.

For example, the obtain input step 286 may also be thought of as a representation of the inputs themselves. Similarly, the provide operator step 288 may be thought of and discussed as the operators 288 themselves. Likewise, the provide operands step 289 may be thought of as the operands 289 themselves.

The nature of the operands 289 is determined by the nature of a link that has been broken between an application 74 and a document 144. For example, a title, a user identification, certain words of text, a document type, an application mail file, or the like may provide inputs 286 that may eventually be parsed or reformed by the create step 290. Alternatively, the provide operands step 289 may directly extract and use certain inputs 286 as operands to be fitted to a standard query 290.

The create standard query step 290 may be thought of as an executable to parse inputs 286 and assemble operands 289 obtained therefrom with operators 288 to form some kind of a standard query 290. Thus, the create standard query 290 may also be thought of as the query created thereby.

It is unnecessary here to describe all of the available operators associated with predicate calculus. Boolean, logical, relational, aggregation, comparator, and other types of operators 288 are available. Thus, any suitable amount of user interaction or automation may be provided for creating 290 a standard query 290. Importantly, inputs 286 associated with a failed link may be available for parsing in order to create a standard query 290.

Figure 9:
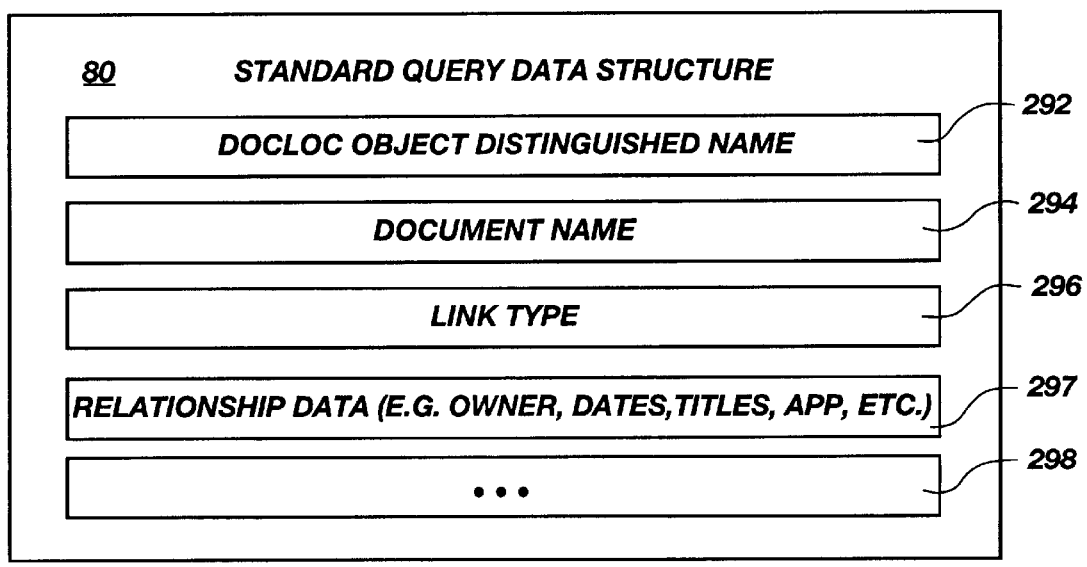
FIG. 9 is a schematic block diagram of one embodiment of a standard query data structure consistent with the invention and provided by the query generator of FIG. 8.

Referring now to FIG. 9, a standard query 290 (see FIG. 8) may be so standardized, in one embodiment, that all operators 288 are fixed in a template or the like. Accordingly, a standard query data structure 80 may be all that is required.

For example, the operands 289 may be parsed by the create step 290 to provide information such as a Docloc object distinguished name 292. The distinguished name 292 may be used to reestablish a link to a document 144 reflected in a Docloc table 140 pointed to by a Docloc object 130 identified by a distinguished name 292. Similarly, the inputs 286 from a query generator 78 (see FIG. 8) may be parsed by the create step 290 to provide a document linked to an application 74.

A link type 296 may be identified. Link types associated with files or documents, may include, for example, links in compiled HELP files, DynaText books and collections of books, or HTML files.

Link types 296 may be extremely informative. A link type 296 may both identify some limited subset of available documents 144 to be considered for a relinking operation, and may provide information regarding other data that should and may be available for reestablishing a link. For example, the nature of a link type 296 will itself dictate the availability of certain associated information. Relationship data 297 may be included in a standard query data structure 80.

Relationship data may include, for example, an identification of an owner of a file. Dates of creation, modification, expiration, or the like, may also be included. Likewise, titles and key words associated with a document 144 or application 74 may be included in the data structure 80. Of particular interest is application-identifying information associated with creation of a particular document 144 of interest.

Other standard data 298 may be included in a standard query data structure 80. For example, the standard query 290 may actually be included in the standard query data structure 80 as one or more items of data 298. For example, the standard query data structure 80 may contain all of the operands 289 bound to the operators 288 by virtue of the relative positions of the operands 289 as data 298 in the standard query data structure 80. In an alternative embodiment, the entire standard query 290, including both operators 288, operands 289, and the relations therebetween as data 298 in the standard query data structure 80.

Figure 10:
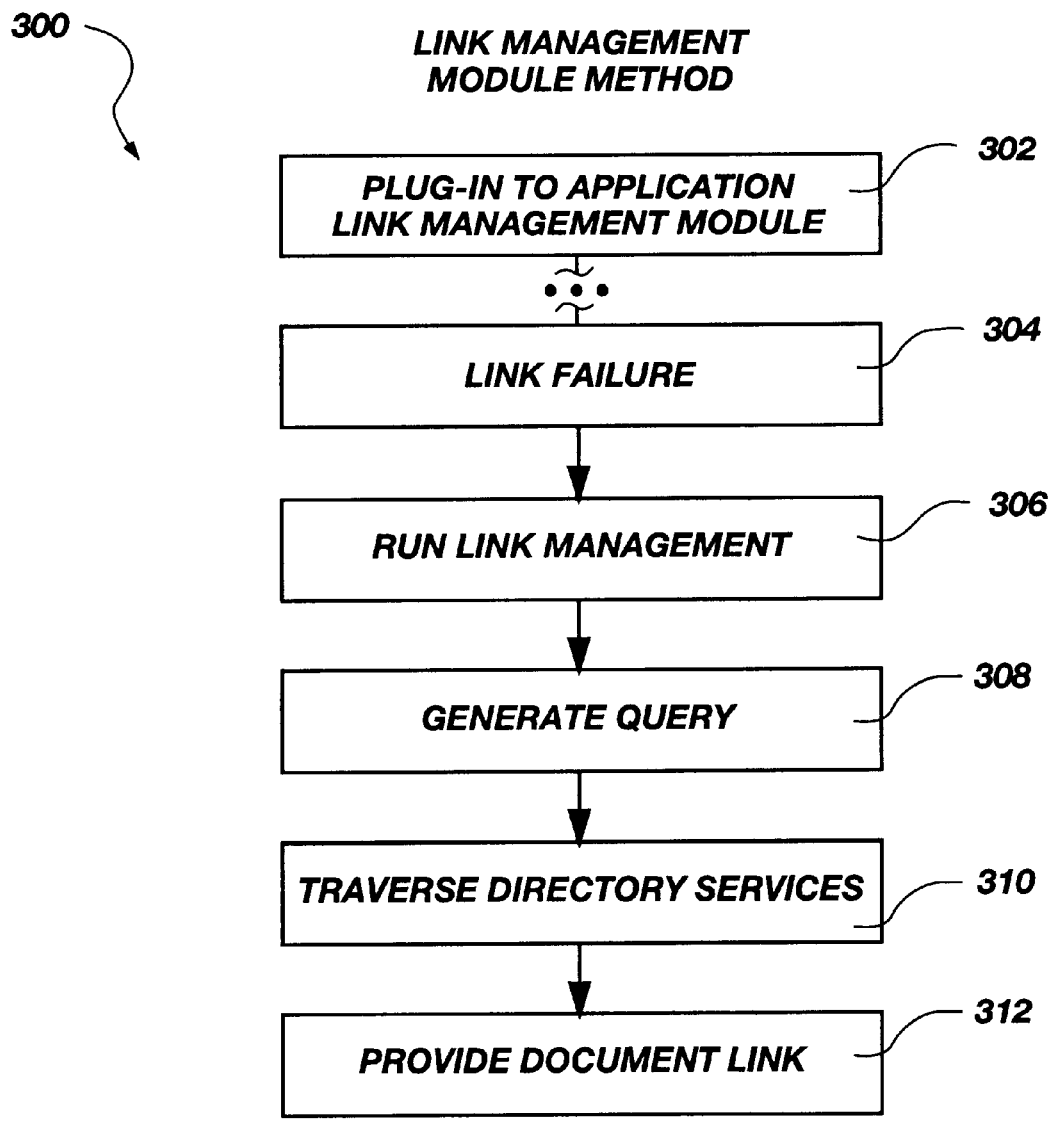
FIG. 10 is a schematic block diagram of a link management method consistent with the invention and the link management method of FIG. 2.

Referring now to FIG. 10, a link management module method 300 may be thought of in relatively gross terms. In one embodiment, a plug-in step 302 may incorporate creation of, or simply providing, a link management module (e.g. link management module 90 of FIG. 2) and plugging in the link management module 90 to an application 74. At some later point, a link failure 304 may occur. The link failure 304 may occur when an application 74 seeks to locate a document 144 that is unlocatable (unavailable). Since the plug-in step 302 plugged a link management module 90 into an application 74, the run step 306 executes the link management module 90.

In one embodiment, the generate query step 308, traverse directory services step 310, and provide document link step 312 may be executed within a link management module 90. Nevertheless, the order of operations or steps 306–312 may occur as illustrated in the method 300, notwithstanding that certain iterations may occur within the traverse step 310. Thus, in general, a run step 306 or an equivalent call step 306 may engage the link management module 90.

The link management module 90, will typically have responsibility for a generate query step 308. The generate query 308 results in a query effective to locate a document 144, for which a link is desired to an application 74. However, one may also consider that a query must be provided to navigate a directory services system 73, such as an object tree 112 or database 112 to find a suitable Docloc object 130 pointing to the proper Docloc table 140 identifying a desired document 144.

Thus, in one embodiment, the generate query step 308 may include generation of a query for navigating a directory services system 73 as well as a query for evaluating a data structure of an object 113 in a directory services database 112, as well as generation of a query to be resolved against the entries 285 in a Docloc table 140, thus identifying a desired document 144.

The traverse directory services step 310 may be embodied in several alternative approaches. In one embodiment, a distinguished name 213 corresponding to a Docloc object 130 may be provided at a link failure 304 or a run step 306. That is, a distinguished name 213 corresponding to a Docloc object 130 effective to locate a desired document 144 to which a link should be made, may typically be available upon link failure 304.

Thus, a traverse step 310 may simply require execution of a directory services search engine 138 of a directory services system 73 in order to locate the proper Docloc object 130. Within the traverse step 310, or subsequently thereto, a Docloc object 130 may vector to the appropriate Docloc table 140 to identify a path 282 and file name 280 corresponding to the desired document 144. Thus, the link management method 300 is consistent with the link management module 90 illustrated in FIG. 2.

The provide document link step 312 may be responsible for simply providing the path 282 and the file name 280 of an appropriate document 144 corresponding to a proper entry 285 from a Docloc table 140. Alternatively, the provide document link step 312 may be responsible for additional processing for returning the application 74 to a previous running state with the proper document 144 linked to the application 74.

Thus, in general, the steps 302–312 may contain each of the required operations to fulfill the broad functionality of detecting a link failure 304. Operations may include calling or running 306 a link management module 90, generating 308 one or more proper queries for identifying a document 144 represented by a Docloc table 140, navigating through the directory services memory device 72 to find the proper Docloc option 130, and querying any appropriate object 113 in a directory services database 112 in search of an appropriate Docloc object 130.

Figure 11:
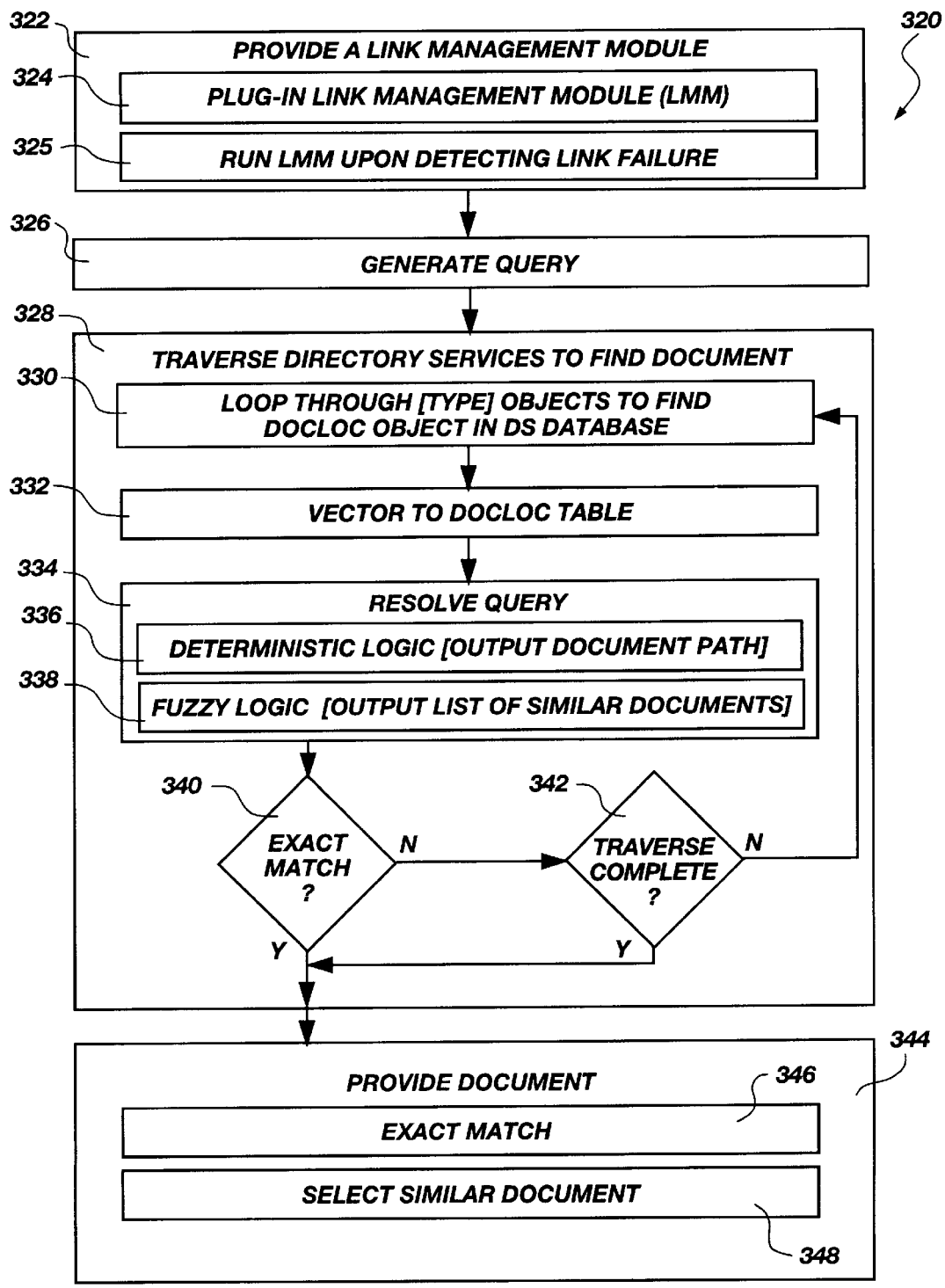
FIG. 11 is a schematic block diagram of an alternate embodiment of a method implementing a link management module for using a network directory services database to maintain and recover links between applications and accessed documents (e.g. files)

Referring now to FIG. 11, one embodiment of a link management method or link management module method 320 may include a provide step 322. The provide step 322 is responsible to provide 322 a link management module 90. The link management module 90 may be embodied in various configurations, of which one presently preferred embodiment is illustrated in FIG. 2.

In the embodiment of FIG. 11, the provide step 322 may include a plug-in step 324 responsible to plug-in a link management module 90 to an application 74. A run step 325 may be responsible to run the link management module 90 upon detecting a link failure. Similarly, a generate query step 326 may generate one or more queries suitable for locating a document 144. As described above, a principal query of interest is a query directed to evaluate entries 285 in a Docloc table 140 to establish the proper file name 280 and path 282 for a desired document 144.

For example, a link failure 304 (see FIG. 10) results in a call 306 or run 306 of a link management module 90 or the like. Thus, in one embodiment, the provide step 322 may be architected to include both providing a link management module 90 as well as plugging-in 324 and running 325, launching, executing, calling, or the like, the link management module 90. This occurs upon link failure 304, or execution of the detect executable 92 available in an application 74. Thus, the responsibilities for providing 322, plugging-in 324, running 325, detecting 92, and the like, may be architected in any suitable manner to engage and support a link management module.

Nevertheless, other queries directed to evaluating data structures of particular objects 113 in a directory services database 112 may be created by the generate query step 326. Queries for supporting a directory services search engine 138 searching for particular objects 113 or searching through particular objects 113 may also be beneficially created by the generate query step 326. Thus, a generate query step 326, containing any one or all of the foregoing queries or associated query data structures, may be embodied in the generate query step 326.

The traverse step 328 is responsible to traverse a directory services database 112 or multiple databases 112 to find a desired document 144. As discussed, a document 144 may be stored as an object 113, stored within an object 113, or pointed to in a file server memory device 70 by an object 113 in a directory services database 112.

This last option is one presently preferred embodiment. The object 113 in a directory services database 112 is a Docloc object 130 to provide indirection and pointing to a Docloc table 140 stored in the memory device 70.

Thus, the traverse step 328 may include one or more nested loops 330. For example, a loop step 330 may loop through different types of objects in order to find a Docloc object 130 in a directory services database 112. In one embodiment, nested loop steps 330 may loop first through a Docloc object 130 and fallback Docloc objects 132 seeking a document 144 listed in an associated Docloc table 140.

In one presently preferred embodiment, the Docloc object 130 or a fallback Docloc object 132 may be located by the directory services search engine 138. If the desired document 144 is not found as a result of querying the Docloc object 130 (or fallback Docloc object 132), with its associated Docloc table 140, then the loop step 330 may continue outward away from an initial Docloc object 130.

The loop step 330 may first examine Docloc objects 130 identified, then fallback Docloc objects 132 (e.g. replicas, duplicates, redundant copies, etc). looping 330 may then move to a user object associated with the application 74 needing a link to a document 144. The loop step 330 may then loop through the data structures within a user object 128 seeking other Docloc objects 130 related to the user object 128 under which an application 74 is operating. Note that a nested loop step 330 through all located Docloc objects 130 identified in such a user object 128 may likewise be searched.

Failing to find the desired document 144 by looping 330 through all Docloc objects 130 identified in or by the user object 128, the loop step 330 may loop outward through group objects 120 related to the user object 128. Again, the nested looping 330 continues through the Docloc objects 130 referenced by the group object 120.

In one presently preferred embodiment, a user object 128 may contain an association list 136 that identifies all Docloc objects 130 related thereto. Similarly, a group object 120 may contain an association list 200 containing lists of distinguished names 210 of Docloc objects 130. Thus, the association list 200 may be rapidly processed to find all Docloc object distinguished names 210 referenced thereby.

Similarly, all container objects 114, which may be thought of as parent objects 114 to user objects 128 or even group objects 120, may be looped through 330, in turn. An objective of a loop step 330 is to loop through each type of object 113 (e.g. Docloc objects 130, user objects 128, group objects 120, container objects 118) in order to identify a desired Docloc object 130.

For example, the association list 136 of a user object 128 in FIG. 4 may contain distinguished names 180 of various Docloc objects 130. Similarly, the group object 120 of FIG. 5 may include an association list 200 containing distinguished names 210 of various Docloc objects 130. Likewise, the container object 114 of FIG. 3 may contain one or more distinguished names 160 of Docloc objects 130 related to the container object 114.

Each time a loop step 330 loops through a particular type of object 113 (e.g. container object 114, group object 120, user object 128, Docloc object 130), it should ultimately arrive at a Docloc object 130, if available. A query data structure 80, or query 80, in combination with a query resolver 84 (see FIG. 2) may then evaluate the attributes 214 of the Docloc object 130, and vector to a Docloc table 140. Likewise, a query 80 or standard query data structure 80 in combination with a query resolver 84 (distinct from such for querying a Docloc object 130) may query a Docloc table 140 to find a file name 280 and path 282 corresponding to a desired document 144. Thus, in FIG. 11 the resolve query step 334 may be thought of as querying a Docloc table 140 to find an appropriate file name 280 and path 282 corresponding to a desired document 144.

A deterministic logic step 336 may find an exact match of a file name 280 and path 282, if available. By contrast, a fuzzy logic step 338 may evaluate, according to non-deterministic methods, file names 280, paths 282, attributes 284, identifiers 278, and the like, that meet some useful, though not exact, matching criterion. Thus, with each resolve query step 334, (if a deterministic logic step 336 is unsuccessful) a fuzzy logic step 338 may identify certain "close" documents 144 or entries 285 pointing to documents 144. If no exact match is ever found by the process 328, a list 89 of candidate entries 285 meriting further consideration may be forwarded to the process 344.

In general, an important concept may be evaluating the entries 285 in a Docloc table 140. This may apply to the create standard query 290 or query 290, the generate query step 96, the query generator 78, standard query data structure 80, and query resolver 84, as well as the generate query step 308, generate query step 326, and resolve query step 334. Nevertheless, one may also see that querying, as a general proposition, is included in searching through the memory device 72 of the directory services server 60. Querying occurs during a looping step 330 evaluating each of the various objects 114, 120, 128, 130 by the directory services search engine 138.

Similarly, a query is involved, or may be involved, depending on a programming method, in evaluating a Docloc object 130. Such an evaluation determines how to vector to a particular path 250 identifying a Docloc table 140. Thus, a combination of queries, certain of the individual queries in the combination, as well as certain of the steps for creating and resolving the individual queries, are unique to the invention regardless of the particular embodiment of an implementation thereof.

After a resolve query step 334, a test 340 may determine whether or not an exact match for a desired document 144 has been located in a Docloc table 140. If not, a test 342 may determine whether or not the traverses of all suitable objects 113 (e.g. Docloc objects 130, 132, user objects 128, group objects 120, and container objects 114 or parent objects 114) have been exhausted. If not, the nested, looping step 330 continues. If the traverse is complete, or an exact match was found, the process 320 advances.

A positive response to the test 340 or the test 342 advances the process 322 to a provide document step 344. If the match was exact, the test 340 results in a positive response. Then an exact match step 346 may provide the exact document 144. The document 144 matches the desired criteria provided in the query 290 and resolved by the deterministic logic step 336 of the resolve query step 334.

On the other hand, if the resolve query step 334 had to rely on the fuzzy logic step 338 to find a "similar" document 144, rather than an exact match, a select similar document step 348 may be relied upon. The select similar document step 338 may provide an automatic evaluation, based on certain fuzzy logic criteria identifying closeness of an entry 285 in a Docloc table 140 to a desired document 144. Alternatively, a user interface 76 may provide an opportunity for a user to select, such as from a menu, a particular document 144 from a list of such similar documents 144.

Thus, in one embodiment, the fuzzy logic step 338 may be implemented automatically in a similarity resolver 86 using fuzzy logic and certain criteria established for evaluating entries 285 in a Docloc table 140. Similarly, the select similar document step 348 may be implemented by a similarity selector executable 87 programmed to execute on the processor 62. The similarity selector 87 may provide user interaction through a user interface 76, or may be entirely automated.

For example, the fuzzy logic step 338 and similarity resolver 86 may contain executables for comparing portions of a file name 280 or portions of a path 282, percentages thereof, numbers of matches between particular portions 276–284 of an individual entry 285, and the like, in order to find non-exact, but probabilistically significant (close), documents 144.

Meanwhile, the select similar documents step 348 and the similarity selector 87, may present a list of probable, likely, close, or the like documents 144 for further evaluation. Executables may include a comparison of documents (information) with one another according to some ranking scheme based on the fuzzy logic. Criteria for selection may be similar to such criteria used to create a list 89 initially. Likewise, in one simple embodiment, user intervention may serve adequately through a user interface 76. Selection by a user from a menu is one embodiment of a similarity selector 87 and a select similar document step 348. If traversal is complete and no exact match nor "similar" documents meet desired criteria, the process 344 simply returns, prompting a failure message.

Referring now to FIG. 12, certain detailed steps and tests may be used to implement the link management methods 300, 320, or link management module methods 300, 320. In general, the link management method 350 or simply the document location method 350, may be subdivided in an appropriate architecture to implement either of the methods 300, 320. Nevertheless, all or part of the method 350 may be used alone, or as an implementation method 350 for either of the methods 300, 320.

In certain embodiments, the method 350 may be thought of as additional details suitable for inclusion or implementation of one embodiment presently preferred for the method 320. Similarly, the method 320 in FIG. 11, may be thought of as one particular, more detailed embodiment of the method 300 in FIG. 10. Nevertheless, one need not suppose that any of the methods 300, 320, 350 must necessarily depend on or conform to another of the methods 300, 320, 350.

Likewise, the link management module 90 may be implemented in an architecture different from that suggested by the methods 300, 320, 350. Nevertheless, in certain embodiments, the link management module 90, and the methods 300, 320, 350 may all be implemented consistently with one another.

The method 350 may be used, in general, to locate a document 144. Thus, the method 350 may be implemented in a stand alone software application. Likewise, the method 350 may be implemented within an application 74 as a link management module 90. The method 350 may be preceded by various steps, for example, providing 322 a link management module 90. Providing 322 may include plugging-in 324 the link management module 90, as well as running 325 the link management module 90 upon detecting a link failure (e.g. link failure 304, detect broken link 92).

Thus, the process 350 may be a stand-alone method 350. Alternatively, it may be included within a link management module 90. The process 350 may follow a generate query step 308, 326 in a respective method 300, 320. Any of the foregoing approaches may be used. Such a choice need not be critical to the successful implementation of the method 350.

A test 352 determines whether or not a network directory services system 73 is available. If not, a search 354 through the local environment may be conducted. The search 354 may or may not rely on a standard query data structure 80 formed by a query generator 78 (e.g. generate query step 308, 326).

A test 356 determines whether or not the document 144 sought is found. If so, a positive response takes the process 350 to a return document step 360. The return document step 360 may include providing a file name 280 and path 282, providing supporting executables, or the like. Sufficient information is provided to an application 74 that a link, ID, path, or the like, assures continued execution of the application 74 relying on a document 144.

A negative response to the test 356 may simply return 358 or exit 358 the entire process 350. Thus, in one currently preferred embodiment, the search step 354 improves over the prospect of a simple detect executable 92 followed by a display message executable 94 identifying a failure 304 of a link, with no further benefit.

If a network directory services system 73 is available, a positive response to the test 352 advances to a test 362. The test 362 determines whether a Docloc object 130, or information related thereto is available. For example, a distinguished name 213 corresponding to a Docloc object 130 may be available to an application 74. If Docloc object information is available, then a positive response to the test 362 advances to the test 364.

The test 364 determines whether or not all original Docloc objects 130 and fallback Docloc objects 132 have been searched in accordance with the available information. Initially, of course, none of the data structures of Docloc objects 130, 132 will have been searched. Eventually, the process 350 will have evaluated the data structures (e.g. attributes 214) of all appropriate Docloc objects 130, 132.

Meanwhile, a negative response to the test 364 indicates that Docloc objects 130, 132 remain to be searched. Accordingly, a provide step 366 is responsible to provide a distinguished name 213, 160, 180, 210, 150, 170, 190, or the like.

In general, the provide distinguished name step 366 may be thought of as providing a particular distinguished name corresponding to any type of object 213. For example, a Docloc object 130, 132, a user object 128, a group object 120, or a container object 114 may be thought of as a "type" or class of object 113 in a directory services database 112.

A nested looping may traverse through all Docloc objects 130, 132, followed by user objects 128, followed by group objects 120, and container objects 114 (parent objects 114). The looping may rely on a provide step 366 providing a next distinguished name of the appropriate type of object 113.

Thus, the provide step 366 may initially provide a distinguished name 213 corresponding to a Docloc object 130, 132.

In one presently preferred embodiment, a set flag step 368 may be responsible to set an object type flag indicating whether or not the current object 113 of interest, as named by a distinguished name 150, 170, 190, 213, corresponds to a Docloc object 130. The set flag step 368 is important in providing a simple trigger for distinguishing the treatment of the data structures of an individual object 114, 120, 128, from the unique data structures (e.g. attributes 214) of a Docloc object 130, 132.

A search step 370 may be responsible for searching through one or more directory services databases 112 to find the desired type of object 113 (e.g. Docloc objects 130, 132, user object 128, group object 120, container object 114) in question. In one presently preferred embodiment, the search step 370 searches for a distinguished name 213, 170, 190, 150, as appropriate. In one embodiment, the directory services search engine 138 may execute the search step 370.

Upon locating, in the search step 370, the appropriate object 113 being sought, a search 372 may search the data structure associated with the located object 113. For example, the attributes 214 of a Docloc object 130, 132 may include other attributes such as an association list 200 of a group object 120. Attributes 164, such as an association list 136, exist in a user object 128. Attributes 146, such as an association list 118, exist in a container object 114 (parent object 114).

Any such attributes 214, 192, 164 may be searched or evaluated by the search step 372. Thus, the search 372 searches the object data structures including rights, access, association lists, paths, and the like, as appropriate, to determine the presence of information sufficient to locate a desired document 144.

In one embodiment, certain objects may include access control lists. An access control list may provide information relating to security. Similarly, an access control list corresponding to a Docloc object 130 may provide access control to a path identifying a Docloc table 140 associated therewith. Similarly, access to an association list may be controlled by an access control list. Typically, rights 122, 134, 116, and the like, are defined according to an identification of an entity, desiring access, and a particular property, to be accessed. Thus, an access control list associating with a particular object 113, such as a Docloc object 130, may provide limiting controls for accessing the attributes 214, 192, 164, such as the association lists 200, 136, 118.

The search 372 may typically include a test for determining a type of an object 113. The test for object type may permit a determination as to how to search a particular data structure 130, 114, 128, and the like. For example, a Docloc object 130 will include a path 250 identifying a Docloc table 140. Similarly, a Docloc object 130 may include a file name 226 identifying a Docloc table 140 specifically.

Moreover, a Docloc object 130 may include duplication data 258, such as a distinguished name 258 of a fallback Docloc object. Thus, a Docloc object 130 may actually identify the distinguished name 258 of a replica or duplicate of a Docloc object 130 containing the same information. The path 250 may be replaced by any pointer to a Docloc table, such as a distinguished name, or list of distinguished names, of documents 144.

Nevertheless, in a presently preferred embodiment, a Docloc object 130 may correspond to a single, associated, Docloc table 140. Accordingly, a pointer 250 (e.g. path 250) and name 246 may effectively become a distinguished name (context and common name) distinctly identifying the appropriate Docloc table 140.

A test 374 may follow the search 372. The test 372 may effectively review the flag 368 set by the set flag step 368. Note that, in general, it may be appropriate to discuss a step 368 or the result 368 of the step 368 by the same reference numeral. Thus, one may discuss the set flag step 368 or the flag 368. Herein, one may even think of a single element of a figure as representing a data structure 368 output by a step 368 achieved by operation of an executable 368 programmed into a processor 12.

The test 374 may operate on the flag 368 to determine whether or not the object 113 being evaluated in the process 350 is a Docloc object 130, 132. A positive response to the test 374 indicates that the object 113 in question is indeed a Docloc object 130, 132. The attributes 214 of the appropriate Docloc object 130, 132 may thus be used. In accordance with the search 372, the process 350 may vector 376 to an appropriate Docloc table 140. The Docloc table 140 is associated with, and pointed to by, the Docloc object 130, 132.

With a Docloc table 140 available, a query data structure 80 may be resolved by a query resolver 84 in the query step 378. Thus, the query step 378 may be responsible to query the Docloc table 140 to determine whether any of the entries 285 contains the file name 280 and path 282 sought. If the correct file name 280 and path 282 are found, an exact match exists. The test 380 provides a positive response advancing to the return step 360. Accordingly, the return step 360 will return the found document 144 as discussed above.

A negative response to the test 380 indicates that the exact document 144 desired has not been found by the query step 378. Thus, an apply similar document criteria step 382 may be executed.

The similar criteria step 382 may apply fuzzy logic, such as the evaluation of all, part, combinations, and the like, of the contents of various field 262 for the available entries 285 in a Docloc table 140. If any similar documents 144 are found by the similar criteria step 382, a test 384 will return a positive response. If no documents have been found by the similar criteria step 382, then the test 384 returns a negative response indicating that no similar document has been found. Note that the similar criteria step 382 may include operations similar to those discussed for the fuzzy logic step 338 of the process 320, and the like.

A positive response to the test 384 indicates that a similar document has been found meeting certain similarity criteria applied by the similar criteria step 382. Meeting the fuzzy logic criteria (similarity criteria) gives a positive response to the test 384, advancing the process 350 to an add step 386.

The add step 386 initiates, creates, or adds to, as appropriate, a list 89. A name, path, or other identifier associated with a similar document 144, becomes an entry in the list 89 of similar documents. If no similar document list 89 exists, the add step 386 may create the similar documents list 89. Thereafter, any subsequent execution of the add step 386 during the process 350 may add a file name 280, path 282, or both 280, 282 to the similar documents list 89.

Returning to the test 374, a negative response indicates that the type of object 113 in question being evaluated as a result of the search 370 is not a Docloc object 130, 132. Accordingly, the negative response to the test 374 advances the process 350 to a test 388. The test 388 evaluates whether or not all Docloc distinguished names 213 from an association list 118, 136, 200 corresponding to an object 113 have been processed. If all the respective distinguished names 160, 180, 210 have been processed, then the test 388 returns control of the process 350 to the test 364.

A negative response to the test 388 advances the process 350 to a find step 390. The find step 390 may be responsible to find the next Docloc object distinguished name 160, 180, 210, from the respective association list 118, 136, 200 of the respective object 114, 128, 120. The find step 390 then advances the process 350 back to the provide step 366.

The find step 390 and the provide step 366, combine to step through each of the distinguished names 160, 180, 210 in the respective association lists 118, 136, 200 as the process 350 loops through each of the respective objects 114, 128, 120. In one currently preferred embodiment, as discussed, the process 350 loops in a nested fashion first through Docloc objects 130, then user objects 128, then group objects 120, then container objects 114 (parent objects 114).

A positive response to test 364, or a negative response to the test 362, indicates that no Docloc objects 130, 132 remain. All available Docloc objects 130, 132 have been evaluated in the search to locate an appropriate Docloc table 140 identifying a desired document 144. Therefore, a positive response to the test 364, or a negative response to the test 362, will advance the process 350 to a test 392 evaluating whether or not all user objects 128 relating to an application 74 have been searched.

A negative response indicates that user objects 128 exist that can still be searched. Actually, association lists 136 may be searched for distinguished names 180 corresponding to Docloc objects 130. Thus, a negative response to the test 392 returns the process 350 to the provide distinguished name step 366.

The distinguished name 180 provided in the provide step 366 may correspond, in this instance, to a distinguished name 170 of a user object 128. A positive response to the test 392 advances the process to a test 394.

The test 394 determines whether or not all group objects 120 have been searched. A negative response to the test 394 indicates that certain group objects 120 exist, whose association lists 200 have not been searched for Docloc object distinguished names 210. Note that a Docloc object distinguished name 210 in an association list 200 of a group object 120 is the distinguished name 213. The distinguished name 213 or corresponding Docloc object 130 may be used to identify another corresponding Docloc table 140 to be searched.

A positive response to the test 394 indicates that all group objects 120 have been searched. Thus, the data structures (e.g. attributes 192) of all group objects 120 identified have been searched for the presence of a desired distinguished name 210. The distinguished name 210 of a Docloc object 130 will be found if it exists in the association list 200.

In similar fashion, a test 396 results from a positive response to the test 394. That is, the test 394 indicates that all group objects 120 have had their data structures 192 searched. Accordingly, a positive response to the test 394 advances the process 350 to the return step 398.

A test 396 determines whether or not all parent objects 114 or container objects 114 have been searched. A negative response to the test 396 indicates that container objects 114 exists, whose association lists 118 have not been searched for distinguished names 160 of Docloc objects 130 of interest. Accordingly, a negative response to the test 396 advances the process 350 to the provide step 366.

By contrast, a positive response to the test 396 indicates that all container objects 114 and association lists 118 have been searched. Thus, a positive response to the test 396 advances the process 350 to a return step 398. The return step 398 returns a list 89 of similar documents 144.

The similar documents list 89 may or may not exist. If the apply similar document criteria step 382 is unsuccessful in meeting the fuzzy logic selection criteria for creating a similar documents list 89, then a list 89 may not exist. Otherwise, upon failure to find an exact match, the similar documents list 89 exists. In such a case the return step 398 returns the similar documents list 89.

The select step 400 may then operate, as described above for a select step 348, or a similarity selector 87. The select step 400 may select a document 144 to be returned. The select step 400 advances the process 350 to the return step 360, returning the selected similar document 144 from the similar documents list 89.

Referring now to FIG. 13, a directory services object 113 is illustrated. In general, a directory services object 113 may include data members 402 and methods 404. As with conventional object-oriented programming, data members 402 may represent outputs, inputs, or the like, associated with the methods 404.

In one embodiment, data members 402 may include, for example, an object name 402a associated with the object 113. An attribute count 402b may indicate the number of attributes 408 to be included in the data members 402. In general, a data member 402 is a broader description of possible attributes of an object 113.

An object status 402c, object state 402d, and buffer 402e may serve the operational needs of a directory services system 73 for maintenance and operation of an object 113. For example, a buffer 402e may store intermediate calculations provided by or required by the methods 404.

One or more pointers 402f may be included as data members 402. In one embodiment, a pointer 406 points to an array 408 of attributes. The attribute array 408 or directory services attribute array 408, may provide a certain amount of indirection between the data members 402, and ultimate values of the attributes 410.

As used herein, a trailing alphabetical character after a reference numeral, represents an instance of an item identified generically by the reference numeral alone. For example, the attributes 410a, 410b, 410n indicate elements 410 of the array 408.

The attributes 410 may have associated therewith data members 412 (e.g. members 412a–412n), and methods 414. In general, each attribute 410 may be thought of as an object containing class data members 412 and associated methods 414. In one presently preferred embodiment, a pointer 416 may be included as a class data member 412a. Thus, a particular instance 410a of the class of attributes 410 may point to an array 418 of pointers 420.

The array 418 of pointers 420 identifies multiple corresponding values 422 of attributes 412. For example, each of the pointers 420a–420c may point to a respective value 422a–422c that a particular class member 412a may take on. Thus, an attribute 402f may be defined by an array 408 of attributes 410. Each attribute 410 may include multiple class data members 412. Each class data member 412 may include a pointer 416 identifying an array 418 of pointers 420. The pointers 420 may then point to specific values 422.

Referring now to FIG. 14, a system 430 for implementing the invention may be represented as an object-oriented structure 430. The system 430 may include various classes 432. Various of the classes 432 may be objects 113.

Nevertheless, some classes 432 may be files or other data structures. In FIG. 14, a legend illustrates the relationships between various classes 432. Thus, a particular class 432 may use another class 432, contain another class 432 by value, or contain another class 432 by reference.

A particular class 432 may have a cardinality 434, 436. A cardinality 434 indicates a single mapping. For example, a cardinality of value one indicates that only one class 432 may be associated with a particular relationship 438. A relationship 438 may be defined in terms of a relation 440 of one class (A), and a relation 442 with another class (B). Each of the relationships 438 is identified by symbology indicating use, containment, and whether or not containment is by value or by reference. Thus, in one embodiment of an apparatus and method in accordance with the invention, the system 430 may be implemented on the apparatus 10 to provide the data structures of FIGS. 2–6 and the methods of FIGS. 7–12.

As illustrated, a link manager 90 may be related to a similarity resolver 86, query generator 78, standard query 80, similarity selector 87, and directory services search engine 138. Similarly, a query generator 78 may be related to a link manager 90, standard query 80, and documents 144. A standard query 80 may be related to a link manager 90, query generator 78, and query resolver 84.

A similarity selector 87 may be related to a link manager 90 and similar document list 89. A similar document list 89 may be related to a similarity selector 87 and documents 144, as well as a query resolver 84.

A directory services search engine 138 may be related to a link manager 90, a context 174, 184, 189, etc., a query resolver 84, a directory services attribute 146, 164, 192, etc., a directory services object 113. A directory services object 113 may be related to a search engine 138, a context 174, 184, 189, etc., and a directory services attribute 146, 164, 192. A query resolver 84 may be related to a search engine 138, a similar documents list 89, a similarity resolver 86, and a Docloc table 140.

In one presently preferred embodiment, the update utility 142 may also operate within or in cooperation with installation software. The update utility 142 operates to update entries 285 in the Docloc table 140. Likewise, the utility 142 will update the links (e.g. pointers, such as attributes 238–260) to the Docloc table 140 in the Docloc object 130.

As discussed above, an application 74 is, in a file-management sense, a "document" 144, an executable document 144. The application 74, however, references other documents 144 that are used or created during execution. Moreover, a first document 144, referenced by an application 74, may reference a second document 144. A broken link may occur between the application 74 and the first document 144, or between the first document 144 and the second document 144.

The application 74, may be generalized. First, the application may be any executable, including an operating system. In one example, an application 74 may contain several executable files, typically identified by a name extension (e.g. INSTALL.EXE; WORD.EXE, etc.). One of these executables may be missing when the application 74 tries to run. The link management module 90 will then locate the lost executable and restore the link. The application 74 may be an installation document missing files to use or to install. A Docloc object 130 and associated Docloc table 140 may be dedicated to each application 74 installed in a system. Another example may include an executable trying to install other files.

A link management module 90 may be responsible to maintain all such links between "documents" 144, generally. The link management module 90 uses a directory services system 73, Docloc objects 130 contained therein, and Docloc tables 140, pointed to, in order to manage the links. The update utility 142 maintains the Docloc tables 140 and Docloc objects 130.

Creation of the Docloc objects 130 and corresponding Docloc tables 140 may be accomplished in several ways. Creation of a Docloc object 130 and Docloc table 140 may occur at the time of installation of a "document" 144 (e.g. application 74, file 144, document 144, etc.) of any type onto the system 10.

For example, a document 144 may typically be installed on a file server 58. An installation utility is typically used to install documents 144. Installation may include decompressing a document 144 and copying it to a storage device 16 on a node 52, 54, 56, 58, 60. As part of an installation, a file system is provided. The file system includes a file structure identifying all documents and their locations.

An installation utility may be created or modified to include a document installation utility (Installdoc) for supporting operation of a link management module 90 over a network. The Installdoc may be responsible to use data identifying the installed documents to create and populate a Docloc table 140. The Installdoc may also create (or control creation of) a Docloc object 130 in the directory services database 112. The Installdoc fills the attributes 214 in the Docloc object 130, including a path 250 and name 246 pointing to a Docloc table 140.

The Installdoc may also execute as a stand-alone utility. Thus, the Installdoc may operate retroactively to permit the link management module 90 to manage links to documents pre-existing in any file system. For example, the Installdoc may create a Docloc table 140 and corresponding Docloc object 130 for any documents 144 (e.g. files, applications, etc.) already existing in a file system.

In one embodiment, an Installdoc utility may be included in the update utility. Thus, the update utility may operate in one of two modes: creating links (e.g. Docloc tables 140 and Docloc objects 130), and updating links (discussed previously herein).

From the above discussion, it will be appreciated that the present invention provides a method and apparatus for managing links between documents 144 and other data structures, such as applications 74 and other documents 144. In one presently preferred embodiment, search mechanisms may first include a directory services search engine 138 for locating objects 113.

Second, a directory object data structure search engine 82 may evaluate, query, search, or the like, various objects 113 to obtain important information contained in data members 402 (e.g. attributes 402) thereof. In one embodiment, an association list handler 88 may be one form of the search engine 82 for searching objects 113 to find association lists 188 and for searching association lists for Docloc objects 130.

Third, a standard query data structure 80 may be resolved by a query resolver 84 to find a document identified in a Docloc table 140 pointed to by the Docloc object 130. A query generator 78 may be responsible to formulate the standard query data structure 80. In certain embodiments, the query generator 78 may formulate queries for all three search engines 138, 82, 84.

Thus, a directory services database 112 may be searched for an object 113. An object 113 may be searched for a particular data member 402 or attribute 402. A Docloc table 140 may be pointed to by a data member 402 of a directory services object 113 (e.g. Docloc object 130). The Docloc table 140 may be searched for an identifier 276, 278 or distinguished name 280, 282 associated with a specific document 144 desired. Likewise, fuzzy logic may be applied to obtain documents 144, that are similar to, rather than identical to, a desired document 144.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by united states letters patent is:

1. An apparatus for managing links to documents within a network of nodes, the nodes including a user station, file server, and directory services server, the apparatus comprising:
   a file server for storing a plurality of documents, including the document;
   a directory services server for executing a directory services system to manage a directory services database, containing directory services objects, including a document location object, being an instance of a directory services object, linked together in a hierarchy;
   a user station configured to execute an installation utility programmed to install the document on the file server and register the document location object in the directory services system for identification of the document by the directory services system; and
   the installation utility being independent from the directory services system.

2. The apparatus of claim 1 wherein the installation utility is programmed to create a table for storing information identifying the plurality of documents, including the document, upon installation thereof.

3. The apparatus of claim 2, wherein the directory services database includes an object effective to identify the table.

4. The apparatus of claim 3 wherein the installation utility is included in an update utility for creating and managing the document, and wherein the update utility is further programmed to update an entry, corresponding to the document, in the table, upon alteration of a status reflected by the entry.

5. A method for managing a link to a document, the method comprising:
   providing a network directory services system for storing and managing a directory services database of directory services objects, including a document location object, being an instance of a directory services object, linked together in a hierarchy over a network;
   providing a link management module for reestablishing a link to a lost document by searching through multiple environments across the network to find the location of the lost document, the link management module being independent from the directory services system and programmed to query the directory services system to find the document location object corresponding to the lost document;
   providing a file server storing a plurality of documents, including the lost document;
   detecting a link failure;
   generating a query containing information corresponding to the link failure;
   traversing, by the link management module, the directory services database to locate the document location object corresponding to the document;
   reestablishing, by the link management module, the link.

6. The method of claim 5, wherein the link is between the document and a computer remote from the document over the network.

7. The method of claim 5, further comprising, before the detecting step, providing a document location object stored in the directory services database and containing pointing data for identifying the document.

8. The method of claim 7, wherein the pointing data points to a document location data structure containing a pointer to the location of the document.

9. The method of claim 8, wherein the document location data structure is located outside of the directory services database.

10. The method of claim 9, wherein the document location data structure is a document location table containing data corresponding to a plurality of documents, including the document, and wherein the document location object corresponds to a single document location table.

11. The method of claim 10, further comprising providing an update utility for updating document location data in the document location table.

12. The method of claim 5, further comprising providing an update utility for updating a document location data structure pointed to by the document location object and pointing to the document.

13. The method of claim 5, wherein the directory services system further comprises a directory services search engine for locating the objects in the directory services database, and wherein traversing further comprises:
   controlling, by the link management module, an order of search to be followed by the directory services search engine, and
   searching by the directory services search engine for the document location object in accordance with the order of search.

14. The method of claim 13, wherein the order of search is configured to provide a traverse beginning at an object having a comparatively close relationship to the link and progressing to objects having a comparatively distant relationship to the link.

15. A method for managing a link to a document, the method comprising:
   providing a network directory services system for storing and managing a directory services database of directory services objects, including a document location object, being an instance of a directory services object, linked together in a hierarchy over a network of nodes, each node containing a processor effective to execute executables;
   executing an installation utility programmed to install the document on a node, the installation utility being independent from the directory services system;
   providing information effective to locate the document; and
   storing to the document location object in the directory services database attributes reflecting the information.

16. The method of claim 15 wherein executing an installation utility is repeated for each of a plurality of documents before the providing information step.

17. The method of claim 16 further comprising creating, prior to performing the storing step, a table containing the information corresponding to a plurality of documents, and wherein the storing step further comprises storing an attribute pointing to the table.

18. The method of claim 16 further comprising creating, before storing step, a table containing the information corresponding to a plurality of documents, and wherein the storing step further comprises storing an attribute pointing to the table.

19. The method of claim 18, wherein the attribute is selected from a document location, security data, a document type, a document format, an owner, a creator, and dates corresponding to a document.

20. An apparatus for managing links to documents within a network of nodes, the nodes including a user station, file server, and directory services server, the apparatus comprising:

the user station programmed to execute a link management module for searching through multiple environments across the network to find and link a lost document to the user station;

a file server storing a plurality of documents, including the lost document;

a directory services system comprising a directory services database, containing directory services objects, including a document location object, being an instance of a directory services object, linked together in a hierarchy, and programmed to execute a search engine effective to search the directory services database for the directory services objects associated with the lost document the link management module being independent from the directory services system and programmed to query the directory services system to find the document location object corresponding to the lost document.

21. The apparatus of claim 20, wherein the link management module further comprises a traverse module for traversing the directory services database.

22. The apparatus of claim 21, wherein the traverse module is programmed to traverse through a plurality of objects in an order beginning at an object having a comparatively close relationship to the link and progressing to objects having a comparatively distant relationship to the link.

23. The apparatus of claim 22, wherein the directory services database stores objects selected from the document location object, a user object, group object, and container object, the document location object being comparatively closest to the link and containing pointing data for identifying the document.

24. The apparatus of claim 23, wherein the file server stores a document location table containing data identifying the document, and wherein the pointing data comprises a pointer pointing to the document location table.

25. The apparatus of claim 24, wherein the document has document attributes related to identification and location of the document, and the file server is programmed to execute an update utility for updating the document location table to reflect changes in the document attributes.

26. The apparatus of claim 20, wherein the user station further comprises a memory device, storing executables, and a processor for executing the executables, the executables further comprising:

a query generator for generating query data effective to identify the document;

a query resolver for comparing data pointed to by the document location object with the query data.

27. The apparatus of claim 26, wherein the query resolver further comprises a similarity resolver for identifying a similar document having a similarity to the document.

28. The apparatus of claim 20, wherein the link management module further comprises a similarity selector for selecting a similar document having a similarity to the document.

29. The apparatus of claim 20, wherein the link management module further comprises an object search engine for searching a data structure of a directory services object in the directory services database.

30. The apparatus of claim 29, wherein the data structure further comprises an association list of distinguished names corresponding to selected objects in the directory services database, and wherein the object search engine further comprises an association list handler for finding a distinguished name corresponding to a the document location object.

31. The apparatus of claim 30, wherein the association list handler further comprises a parser for parsing the association list.

32. The apparatus of claim 20, wherein the document has document attributes stored in a document location data structure and related to identification and location of the document, and wherein a node of the nodes is programmed to execute an update utility for updating the document location data structure to reflect changes in the document attributes.

33. The apparatus of claim 20, wherein the file server is programmed to execute an update utility to create a document location data structure and the document location object pointing thereto.

* * * * *